(12) United States Patent
Tanaka

(10) Patent No.: US 9,497,084 B2
(45) Date of Patent: Nov. 15, 2016

(54) DISPLAY FILTERING IN DEVICE MANAGEMENT SYSTEM

(75) Inventor: Shun Tanaka, West New York, NJ (US)

(73) Assignee: RICOH COMPANY, LTD., Tokyo (JP)

( * ) Notice: Subject to any disclaimer, the term of this patent is extended or adjusted under 35 U.S.C. 154(b) by 403 days.

(21) Appl. No.: 13/036,644

(22) Filed: Feb. 28, 2011

(65) Prior Publication Data
US 2012/0221954 A1 Aug. 30, 2012

(51) Int. Cl.
*H04L 12/24* (2006.01)
*G06F 17/30* (2006.01)
*G06F 3/0482* (2013.01)

(52) U.S. Cl.
CPC ......... *H04L 41/22* (2013.01); *G06F 17/30554* (2013.01); *G06F 3/0482* (2013.01)

(58) Field of Classification Search
CPC ............. G06F 3/0482; G06F 3/04842; G06F 17/30867; G06F 3/04847; G06F 17/30554; H04L 41/22
USPC ......... 715/736, 810, 734, 738, 754; 707/754
See application file for complete search history.

(56) References Cited

U.S. PATENT DOCUMENTS

| | | | |
|---|---|---|---|
| 7,596,716 B2 * | 9/2009 | Frost et al. ................. 714/25 |
| 2005/0108748 A1* | 5/2005 | Nishikawa et al. ........... 725/38 |
| 2007/0074130 A1* | 3/2007 | Folting et al. ................ 715/792 |
| 2007/0216932 A1* | 9/2007 | Osadchyy et al. .......... 358/1.15 |
| 2007/0226204 A1* | 9/2007 | Feldman ........... G06F 17/30958 |
| 2008/0140822 A1* | 6/2008 | Torii ............................. 709/223 |
| 2011/0055203 A1* | 3/2011 | Gutt et al. .................... 707/722 |
| 2011/0093478 A1* | 4/2011 | Starks et al. ................. 707/754 |
| 2011/0173270 A1 | 7/2011 | Uchida et al. |
| 2012/0151356 A1* | 6/2012 | Wagenblatt .................. 715/736 |

OTHER PUBLICATIONS

U.S. Appl. No. 12/722,367, filed Mar. 11, 2010 of Yuki Uchida et al.
U.S. Appl. No. 12/722,370, filed Mar. 11, 2010 of Yuki Uchida et al.
U.S. Appl. No. 12/722,374, filed Mar. 11, 2010 of Yuki Uchida et al.
U.S. Appl. No. 12/722,376, filed Mar. 11, 2010 of Yuki Uchida et al.
U.S. Appl. No. 12/722,381, filed Mar. 11, 2010 of Yuki Uchida et al.
U.S. Appl. No. 12/958,686, filed Dec. 2, 2010 of Shun Tanaka.
U.S. Appl. No. 13/014,384, filed Jan. 26, 2011 of Shun Tanaka.
U.S. Appl. No. 13/036,455, filed Feb. 28, 2011 of Shun Tanaka.
U.S. Appl. No. 13/036,558, filed Feb. 28, 2011 of Shun Tanaka.
U.S. Appl. No. 13/036,745, filed Feb. 28, 2011 of Shun Tanaka et al.
U.S. Appl. No. 13/086,608, filed Apr. 14, 2011 of Shun Tanaka et al.
U.S. Appl. No. 13/086,779, filed Apr. 14, 2011 of Shun Tanaka et al.

* cited by examiner

*Primary Examiner* — Steven Sax
*Assistant Examiner* — Christopher J Fibbi
(74) *Attorney, Agent, or Firm* — Cooper & Dunham LLP

(57) ABSTRACT

Apparatuses, systems and methods are provided for monitoring a plurality of information technology devices. A filter control window displays user-selectable filter criteria items. The filter is applied to display a device list that includes only devices that match the selected ones of the filter criteria items.

18 Claims, 34 Drawing Sheets

Fig. 3

| DEVICE INFORMATION | | | | |
|---|---|---|---|---|
| Manufacturer | Model | Type | Status | Location |
| Ricoh | Aficio 9100DN | Printer | Ready | Room 430 |
| Ricoh | Aficio C821DN | Printer | Ready | Lobby |
| Ricoh | Aficio GX3000 | Printer | Out of Paper | Conference Room C |
| Ricoh | FAX5510L | Fascimile | Ready | Room 67 |
| Ricoh | Aficio MP C5501 | MFD | Ready | Room 303 |
| ABC_Brand | CP986 | Printer | Paper Jam | Conference Room C |
| ABC_Brand | P132 | Printer | Paper Jam | Conference Room B |
| ABC_Brand | 4234 | MFD | Out of Paper | Mail Room |
| XYZ_Brand | Laser D11 | Printer | Toner Out | Room 1202 |
| XYZ_Brand | 25F | Scanner | Ready | Conference Room B |

DEVICE LIST

| Manufacturer | Model | Type | Status | Location |
|---|---|---|---|---|
| Ricoh | Aficio 9100DN | Printer | Ready | Room 430 |
| Ricoh | Aficio C821DN | Printer | Ready | Lobby |
| Ricoh | Aficio GX3000 | Printer | Out of Paper | Conference Rm C |
| Ricoh | FAX5510L | Fax | Ready | Room 67 |
| Ricoh | Aficio MP C5501 | MFD | Ready | Room 303 |
| ABCD_Brand | CP986 | Printer | Paper Jam | Conference Rm C |
| ABCD_Brand | P132 | Printer | Paper Jam | Conference Rm B |
| ABCD_Brand | 4234 | MFD | Out of Paper | Mail Room |
| XYZ_Brand | Laser D11 | Printer | Toner Out | Room 1202 |
| XYZ_Brand | 25F | Scanner | Ready | Conference Rm B |

FILTER PANE

MANUFACTURER
Ricoh (5)
ABCD_Brand (3)
XYZ_Brand (2)

Fig. 4A

DEVICE LIST

| Manufacturer | Model | Type | Status | Location |
|---|---|---|---|---|
| XYZ_Brand | Laser D11 | Printer | Toner Out | Room 1202 |
| XYZ_Brand | 25F | Scanner | Ready | Conference Rm B |

FILTER PANE

MANUFACTURER
Ricoh (5)
ABCD_Brand (3)
✓ XYZ_Brand (2)

Fig. 4B

DEVICE LIST

| Manufacturer | Model | Type | Status | Location |
|---|---|---|---|---|
| Ricoh | Aficio 9100DN | Printer | Ready | Room 430 |
| Ricoh | Aficio C821DN | Printer | Ready | Lobby |
| Ricoh | Aficio GX3000 | Printer | Out of Paper | Conference Rm C |
| Ricoh | FAX510L | Fax | Ready | Room 67 |
| Ricoh | Aficio MP C5501 | MFD | Ready | Room 303 |
| ABCD_Brand | CP986 | Printer | Paper Jam | Conference Rm C |
| ABCD_Brand | P132 | Printer | Paper Jam | Conference Rm B |
| ABCD_Brand | 4234 | MFD | Out of Paper | Mail Room |
| XYZ_Brand | Laser D11 | Printer | Toner Out | Room 1202 |
| XYZ_Brand | 25F | Scanner | Ready | Conference Rm B |

FILTER PANE

MANUFACTURER
Ricoh (5)
ABCD_Brand (3)
XYZ_Brand (2)

STATUS
Ready (5)
Paper Jam (2)
Out of Paper (2)
Toner Out (1)

TYPE
Printer (6)
Fax (1)
MFD (2)
Scanner (1)

Fig. 7A

DEVICE LIST

| Manufacturer | Model | Type | Status | Location |
|---|---|---|---|---|
| Ricoh | Aficio 9100DN | Printer | Ready | Room 430 |
| Ricoh | Aficio C821DN | Printer | Ready | Lobby |
| Ricoh | Aficio GX3000 | Printer | Out of Paper | Conference Rm C |
| Ricoh | FAX5510L | Fax | Ready | Room 67 |
| Ricoh | Aficio MP C5501 | MFD | Ready | Room 303 |
| ABCD_Brand | CP986 | Printer | Paper Jam | Conference Rm C |
| ABCD_Brand | P132 | Printer | Paper Jam | Conference Rm B |
| ABCD_Brand | 4234 | MFD | Out of Paper | Mail Room |

FILTER PANE

MANUFACTURER
✓ Ricoh (5)
✓ ABCD_Brand (3)
   XYZ_Brand (2)

STATUS
Ready (4)
Paper Jam (2)
Out of Paper (2)

TYPE
Printer (5)
Fax (1)
MFD (2)

Fig. 7B

DEVICE LIST

| Manufacturer | Model | Type | Status | Location |
|---|---|---|---|---|
| Ricoh | Aficio GX3000 | Printer | Out of Paper | Conference Rm C |
| ABCD_Brand | 4234 | MFD | Out of Paper | Mail Room |

FILTER PANE

MANUFACTURER
✓ Ricoh (5)
✓ ABCD_Brand (3)
XYZ_Brand (2)

STATUS
Ready (4)
Paper Jam (2)
✓ Out of Paper (2)

TYPE
Printer (1)
MFD (1)

Fig. 7C

DEVICE LIST

| Manufacturer | Model | Type | Status | Location |
|---|---|---|---|---|
| Ricoh | Aficio GX3000 | Printer | Out of Paper | Conference Rm C |

FILTER PANE

MANUFACTURER
✓ Ricoh (5)
✓ ABCD_Brand (3)
  XYZ_Brand (2)

STATUS
  Ready (4)
  Paper Jam (2)
✓ Out of Paper (2)

TYPE
✓ Printer (1)
  MFD (1)

Fig. 7D

DEVICE LIST

| Manufacturer | Model | Type | Status | Location |
|---|---|---|---|---|
| Ricoh | Aficio GX3000 | Printer | Out of Paper | Conference Rm C |

FILTER PANE

MANUFACTURER
- ✓ Ricoh (5)
- ✓ ABCD_Brand (3)
- XYZ_Brand (2)

STATUS
- Ready (4)
- Paper Jam (2)
- ✓ Out of Paper (2)

TYPE
- ✓ Printer (1)
- MFD (1)

Fig. 9A

DEVICE LIST

| Manufacturer | Model | Type | Status | Location |
|---|---|---|---|---|
| Ricoh | Aficio GX3000 | Printer | Out of Paper | Conference Rm C |
| ABCD_Brand | 4234 | MFD | Out of Paper | Mail Room |

FILTER PANE

MANUFACTURER
- ✓ Ricoh (5)
- ✓ ABCD_Brand (3)
- XYZ_Brand (2)

STATUS
- Ready (4)
- Paper Jam (2)
- ✓ Out of Paper (2)

Fig. 9B

DEVICE LIST

| Manufacturer | Model | Type | Status | Location |
|---|---|---|---|---|
| Ricoh | Aficio 9100DN | Printer | Ready | Room 430 |
| Ricoh | Aficio C821DN | Printer | Ready | Lobby |
| Ricoh | Aficio GX3000 | Printer | Out of Paper | Conference Rm C |
| ABCD_Brand | CP986 | Printer | Paper Jam | Conference Rm C |
| ABCD_Brand | P132 | Printer | Paper Jam | Conference Rm B |

FILTER PANE

MANUFACTURER
- ✓ Ricoh (5)
- ✓ ABCD_Brand (3)
- XYZ_Brand (2)

TYPE
- ✓ Printer (5)
- Fax (1)
- MFD (2)

Fig. 9C

DEVICE LIST

| Manufacturer | Model | Type | Status | Location |
|---|---|---|---|---|
| Ricoh | Aficio GX3000 | Printer | Out of Paper | Conference Rm C |

FILTER PANE

STATUS
Ready (5)
Paper Jam (2)
✓ Out of Paper (2)
Toner Out (1)

TYPE
✓ Printer (1)
MFD (1)

Fig. 9D

DEVICE LIST

| Manufacturer | Model | Type | Status | Location |
|---|---|---|---|---|
| Ricoh | Aficio GX3000 | Printer | Out of Paper | Conference Rm C |
| ABCD_Brand | 4234 | MFD | Out of Paper | Mail Room |

FILTER PANE

MANUFACTURER
✓ Ricoh (5)
✓ ABCD_Brand (3)
XYZ_Brand (2)

STATUS
Ready (4)
Paper Jam (2)
✓ Out of Paper (2)

TYPE
Printer (1)
MFD (1)

Fig. 11A

DEVICE LIST

| Manufacturer | Model | Type | Status | Location |
|---|---|---|---|---|
| Ricoh | Aficio GX3000 | Printer | Out of Paper | Conference Rm C |
| ABCD_Brand | 4234 | MFD | Out of Paper | Mail Room |

FILTER PANE

STATUS
Ready (5)
Paper Jam (2)
✓ Out of Paper (2)
Toner Out (1)

MANUFACTURER
✓ Ricoh (1)
✓ ABCD_Brand (1)

TYPE
Printer (1)
MFD (1)

Fig. 11B

DEVICE LIST

| Manufacturer | Model | Type | Status | Location |
|---|---|---|---|---|
| Ricoh | Aficio GX3000 | Printer | Out of Paper | Conference Rm C |
| ABCD_Brand | 4234 | MFD | Out of Paper | Mail Room |

FILTER PANE

MANUFACTURER
✓ Ricoh (5)
✓ ABCD_Brand (3)
  XYZ_Brand (2)

STATUS
  Ready (4)
  Paper Jam (2)
✓ Out of Paper (2)

TYPE
  Printer (1)
  MFD (1)

Fig. 13A

User Interface Screen

Please choose a new filter block:

```
Location
Output Technology
Device Location Type
Scope
Connection Type
Device Age
Functions
Firmware Version
Install Applications
Organization
Supply Level
Capability
Last Status Update
Duplex Usage
Paper Size Usage
Pages Per Minute (PPM) range
Color Technology
Audit Results/Analysis
```

SUBMIT

Fig. 13B

DEVICE LIST

| Manufacturer | Model | Type | Status | Location |
|---|---|---|---|---|
| Ricoh | Aficio GX3000 | Printer | Out of Paper | Conference Rm C |
| ABCD_Brand | 4234 | MFD | Out of Paper | Mail Room |

FILTER PANE

MANUFACTURER
✓ Ricoh (5)
✓ ABCD_Brand (3)
XYZ_Brand (2)

STATUS
Ready (4)
Paper Jam (2)
✓ Out of Paper (2)

TYPE
Printer (1)
MFD (1)

LOCATION
Conf Rm C (1)
Mail Room (1)

Fig. 13C

DEVICE LIST

| Manufacturer | Model | Type | Status | Location |
|---|---|---|---|---|
| Ricoh | Aficio 9100DN | Printer | Ready | Room 430 |
| Ricoh | Aficio C821DN | Printer | Ready | Lobby |
| Ricoh | Aficio GX3000 | Printer | Out of Paper | Conference Rm C |
| Ricoh | FAX5510L | Fax | Ready | Room 67 |
| Ricoh | Aficio MP C5501 | MFD | Ready | Room 303 |

FILTER PANE

MANUFACTURER
✓ Ricoh (5)
ABCD_Brand (3)
XYZ_Brand (2)

[CREATE/EDIT GROUP SET]

Fig. 16A

DEVICE LIST

| Manufacturer | Model | Type | Status | Location |
|---|---|---|---|---|
| Ricoh | Aficio 9100DN | Printer | Ready | Room 430 |
| Ricoh | Aficio C821DN | Printer | Ready | Lobby |
| Ricoh | Aficio GX3000 | Printer | Out of Paper | Conference Rm C |
| Ricoh | FAX5510L | Fax | Ready | Room 67 |
| Ricoh | Aficio MP C5501 | MFD | Ready | Room 303 |
| ABCD_Brand | CP986 | Printer | Paper Jam | Conference Rm C |
| ABCD_Brand | P132 | Printer | Paper Jam | Conference Rm B |
| ABCD_Brand | 4234 | MFD | Out of Paper | Mail Room |
| XYZ_Brand | Laser D11 | Printer | Toner Out | Room 1202 |
| XYZ_Brand | 25F | Scanner | Ready | Conference Rm B |

FILTER PANE

MANUFACTURER
Ricoh (5)
ABCD_Brand (3)
XYZ_Brand (2)

Devices To Replace
Replace in 2011 (1)
Replace in 2012 (3)

[CREATE/EDIT GROUP SET]

Fig. 16D

DEVICE LIST

| Manufacturer | Model | Type | Status | Location |
|---|---|---|---|---|
| Ricoh | FAX5510L | Fax | Ready | Room 67 |

FILTER PANE

| MANUFACTURER |
|---|
| Ricoh (5) |
| ABCD_Brand (3) |
| XYZ_Brand (2) |

| Devices To Replace |
|---|
| ✓ Replace in 2011 (1) |
| Replace in 2012 (3) |

CREATE/EDIT GROUP SET

Fig. 16E

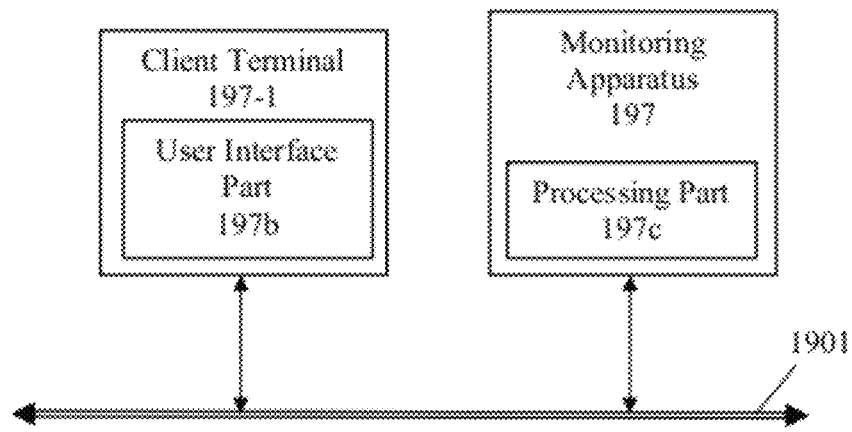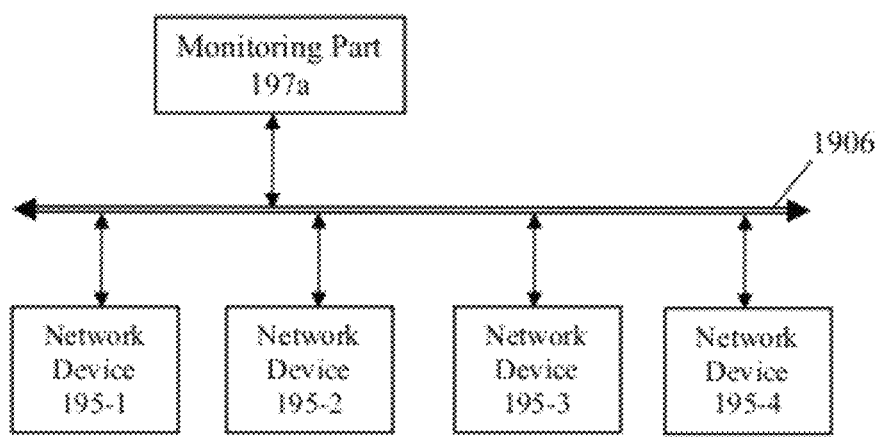
Fig. 19

DISPLAY FILTERING IN DEVICE MANAGEMENT SYSTEM

TECHNICAL FIELD

This disclosure relates to tools (systems, apparatuses, methodologies, computer program products, etc.) for monitoring and administering information technology devices connected to a network.

BACKGROUND

In the current information age, information technology (IT) tools are extensively used in enterprises and other organizations in order to facilitate processing of documents and data. IT administrators typically have the responsibilities of monitoring and managing IT assets, such as computers, printers, scanners, multi-function devices (MFDs), other network-connected or standalone devices, etc.

IT management tools (such as application software) are available to assist IT administrators with performing their duties. Such tools commonly include a monitoring device and/or application for monitoring the IT tools and obtaining various information regarding the IT tools (such as make, model, location, status). An example of a user interface in such monitoring tool is illustrated in FIG. 1. The user interface screen shown in FIG. 1 allows a user to select a device from the displayed device list and then additional information regarding the selected device is displayed.

However, such user interface does not allow the user to efficiently obtain information regarding IT devices that need administration or otherwise. This may especially be a problem if, for example, a large number of IT assets are within the IT environment that is administered.

There remains a need for an improved tool for IT administrators to administer large collections of IT assets.

SUMMARY

In an aspect of this disclosure, there is provided a tool (for example, an apparatus, application software, computer program product, etc.) to help information technology (IT) administrators with management of IT assets. Such tool maintains device information identifying a plurality of network devices and, for each of the network devices, device properties and a status of the network device, and displays a filter control window including one or more user-selectable filter criteria items, and processes the device information based on selected ones of the filter criteria items, and causes a device list to be displayed that identifies only specific ones of the network devices matching the selected filter criteria items.

In another aspect, a plurality of filter blocks are displayed in the filter control window, each filter block including one or more of the user-selectable filter criteria items. If a first filter block is dragged out of the filter control window via a drag-and-drop operation, then all of the filter control items of the first filter block are unselected, and the device information is processed based on selected filter criteria items in each of the remaining filter blocks in the filter control window, to generate the revised device list.

In another aspect, the device information is processed based on the selected filter criteria items, and a revised device list is generated that identifies only specific ones of the network devices matching at least one selected filter criteria item from each of the filter blocks having one or more selected filter criteria items.

In another aspect, a plurality of filter blocks are displayed in the filter control window in a specific sequence, each filter block including one or more of the user-selectable filter criteria items. If one or more filter criteria items in a first filter block are selected, all of the filter blocks appearing after the first filter block in the specific sequence are modified, to generate modified filter blocks including only filter criteria items applicable to network devices that satisfy at least one of said one or more selected filter criteria items in the first filter block.

In another aspect, there is displayed, for each of the filter criteria items in a first filter block, a device count corresponding to a number of the network devices that match the filter criteria item, and match at least one of the selected filter criteria items from each of the filter blocks that (a) have one or more selected filter criteria items and (b) appear before the first filter block in the specific sequence.

In another aspect, the specific sequence is changed after the plurality of filter blocks displayed in the filter control window are rearranged via a drag-and-drop operation.

In another aspect, the specific sequence is changed after one of the filter blocks is removed from the filter control window via a drag-and-drop operation, the changed specific sequence not including the removed filter block.

In another aspect, the specific sequence is changed after a new filter block is positioned inside the filter control window from a new filter block palette via a drag-and-drop operation, the changed specific sequence including the new filter block.

In another aspect, there is generated a group set filter block, and there is generated a group item corresponding to the group set filter block and being associated with one or more of the network devices. Auto-grouping criteria corresponding to the group item may be generated based on currently selected filter criteria items, and if it is determined that a newly discovered network device matches the auto-grouping criteria, the newly discovered network device is automatically added to the group item.

BRIEF DESCRIPTION OF THE DRAWINGS

The aforementioned and other aspects, features and advantages can be more readily understood from the following detailed description with reference to the accompanying drawings wherein:

FIG. 3 shows an example of a table registering device information for each of various network devices, such as network devices 25-1 through 25-n depicted in FIG. 2;

FIGS. 4A and 4B illustrate examples of user interface screens;

FIGS. 7A through 7D illustrate examples of user interface screens, according to another exemplary embodiment;

FIGS. 9A through 9D illustrate examples of user interface screens, according to another exemplary embodiment;

FIGS. 11A and 11B illustrate examples of user interface screens, according to another exemplary embodiment;

FIGS. 13A-13C illustrate examples of user interface screens, according to another exemplary embodiment;

FIGS. 16A-16E illustrate examples of user interface screens, according to another exemplary embodiment;

FIG. 19 shows a block diagram of a system, according to another exemplary embodiment.

DETAILED DESCRIPTION

Figure 1:
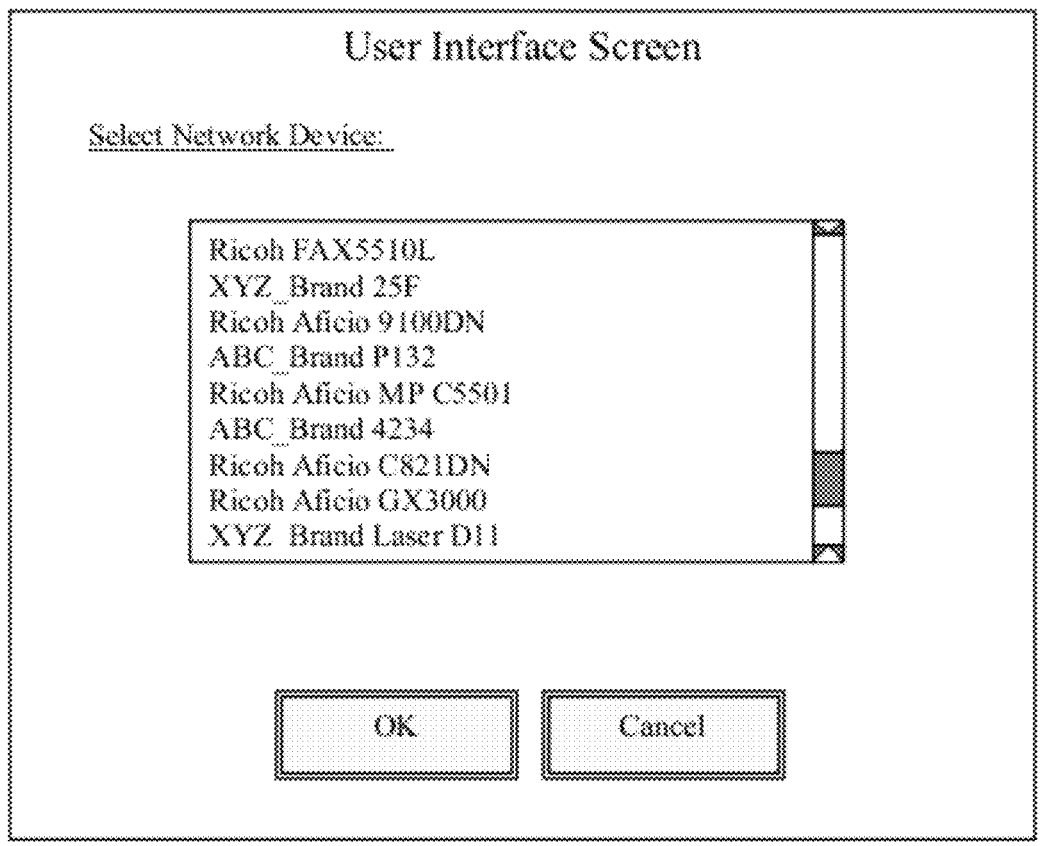
FIG. 1 illustrates an example of a user interface screen.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, there is described tools (systems, apparatuses, methodologies, computer program products, etc.) for monitoring information technology devices, such as computers, printers, scanners, multi-function devices, and other network-connected, or standalone devices.

Figure 2:
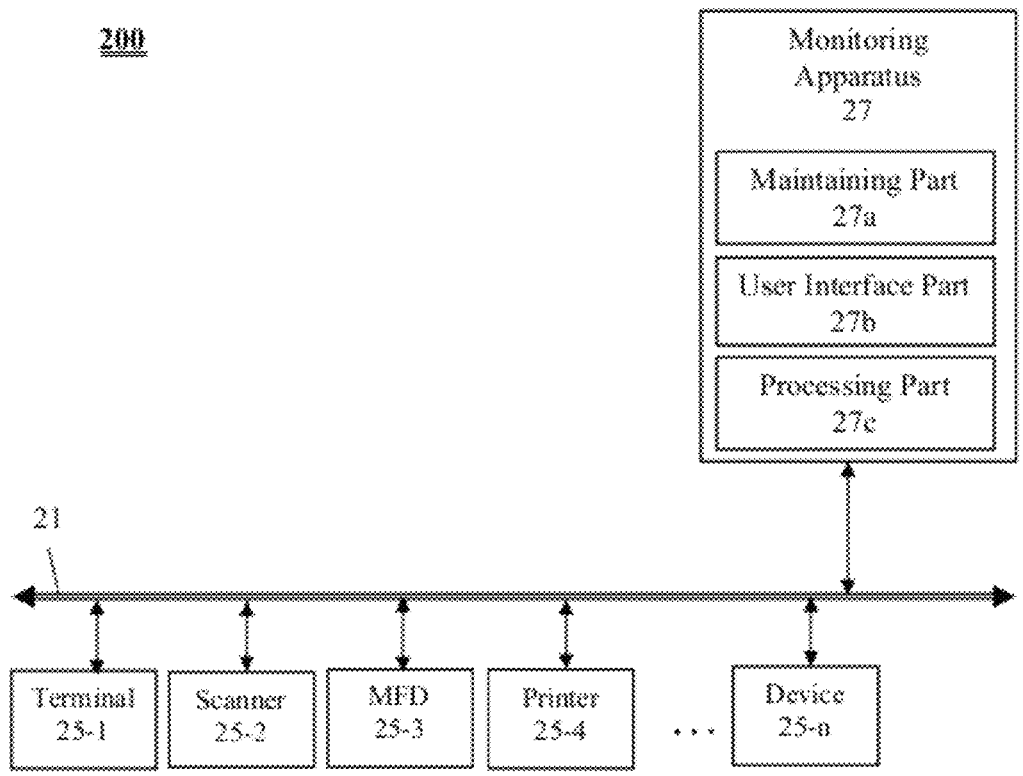
FIG. 2 shows a block diagram of a system, according to an exemplary embodiment.

For example, FIG. 2 shows schematically a system 200 for monitoring a plurality of devices connected to a network, according to an exemplary embodiment. System 200 includes a plurality of network devices (i.e. network-connected devices) 25-1 through 25-n and a monitoring apparatus 27, all interconnected by a network 21. The plurality of network devices 25-1 through 25-n includes, for example, a terminal 25-1, scanner 25-2, MFD 25-3 and printer 25-4.

Monitoring apparatus 27 of FIG. 2 includes a device information maintaining part 27a, user interface part 27b, and a processing part 27c.

The device information maintaining part 27a of the monitoring apparatus 27 is configured to maintain device information identifying a plurality of network devices (such as network devices 25-1 through 25-n, for example) and, for each of the network devices, one or more device properties corresponding to the network device and/or a status of the network device.

An example of device information is depicted in FIG. 3. In the example of FIG. 3, the device information identifies a plurality of network devices (by "Manufacturer" and "Model", for example), such as Ricoh Aficio GX3000, and ABC Brand CP986. The device information of FIG. 3 lists, for each of the network devices, one or more corresponding device properties such as manufacturer, model, device type, status and location. For example, the device type property corresponding to the network device Ricoh Aficio MP C5501 is "MFD", the status property corresponding to the network device ABC Brand P132 is "Paper Jam", the location property corresponding to network device XYZ Brand 25F is "Conference Room B", and so forth. The information depicted in FIG. 3 is merely exemplary, and other network devices and/or device properties may be included in the device information.

The device information maintaining part 27a (or a communication part of the monitoring apparatus 27) may communicate with one or more of the plurality of network devices 25-1 through 25-n to obtain the various device properties information of each device. For example, many printers and other devices store data indicating their attributes or properties in a Management Information Base (MIB). The MIB may conform with the SNMP (Simple Network Management Protocol) protocol, and properties information can be obtained directly from the MIB through SNMP queries. The device information maintaining part 27a may obtain the device properties information of each device (such as the status of each device) by monitoring the network 21 itself, and detecting and receiving one or more alert notifications or status updates transmitted to the network from any of the plurality of network devices 25-1 through 25-n. The monitoring apparatus 27 may receive the status updates by repeatedly transmitting requests (via the device information maintaining part 27a or a communication part) to the network devices 25-1 through 25-n via the network 21, inquiring as to the status of each network device. In response, each network device may transmit status updates back to the monitoring apparatus 27, wherein each status update indicates the status of the device, whether an error exists or has occurred at the network device, etc. Alternatively, each network device 25-1 through 25-n may automatically transmit status updates to the monitoring apparatus 27 (without waiting for requests or queries from the monitoring apparatus 27), at regular intervals or whenever an error occurs at the network device. The monitoring apparatus 27 may include locally resident hardware and/or software agents installed locally on each of the network devices 25-1 through 25-n, which are configured to transmit the status updates directly to a communication part of the monitoring apparatus 27 (or to the device information maintaining part 27a installed at the monitoring apparatus 27). The device information maintained by the device information maintaining part 27a may be stored along with other data in a storage part (not shown) of the management apparatus. Alternatively, the device information can be stored externally to the monitoring apparatus 27 and retrieved (for example through the network) as needed.

The device information maintaining part 27a may be comprised of an operating system (OS) function or other system function capable of maintaining the device information, as described above. For example, the maintaining part 27a may utilize the functionalities of a directory service such as Microsoft Active Directory. Directory services such as Active Directory utilize one or more application protocols, such as the Lightweight Directory Access Protocol (LDAP), to provide a variety of network services, such as the ability to maintain, read and/or edit directories or sets of records over an IP network. In this way, such a directory service may be utilized to store information and settings for the deployment of a plurality of network devices in a central database, allowing an administrator to manage and monitoring a plurality of network devices.

The user interface part 27*b* of the monitoring apparatus 27 is configured to display a device list that identifies the plurality of network devices. FIG. 4A depicts an example of a user interface screen displayed on a display part of the apparatus 27 by the user interface part 27*b*. As illustrated in FIG. 4A, the user interface screen displays a device list on the right side of the screen, for example, where the device list includes the same information as depicted in the device information (i.e. identifies one or more network devices and, for each of the network devices, one or more corresponding device properties). The device list illustrated in FIG. 4A includes the same information as depicted in the device information in the example of FIG. 3.

The user interface part 27*b* is also configured to display a filter control window (also referred to as a "filter pane") alongside the device list in the user interface screen. As seen in FIG. 4A, the filter control window includes one or more user-selectable filter criteria items i.e. the filter criteria items "Ricoh", "ABCD_Brand" and "XYZ Brand". These filter criteria items are included in a filter block labeled "Manufacturer", indicating that these filter criteria items may be used to filter the device information and/or information in the device list, based on the criteria related to a "Manufacturer" property of a network device.

The user interface part 27*b* may include hardware and/or software configured to display a graphical user interfaces (GUI) and/or an object-oriented user interface on a display part (such as a monitor, display screen, etc.) of the monitoring apparatus 27 or network-connected client terminal, and which accepts inputs via an input part (such as a keyboard, mouse, touchscreen, etc.) of the monitoring apparatus 27 or network-connected client terminal. The user interface part 27*b* may in addition or instead include a Web-based user interface or web user interface (WUI) that generates web pages which are transmitted via the network 21 or the Internet and viewed by the user using a web browser program on the monitoring apparatus 27 or a client terminal connected to the network 21.

The user interface part 27*b* may be implemented utilizing software programs and/or languages such as Java, AJAX, Adobe Flex, Microsoft .NET, or similar technologies.

The processing part 27*c* of the monitoring apparatus 27 is configured to process the device information and/or device list based on selected ones of the filter criteria items, and cause the user interface part 27*b* to display a device list (or revised device list) that identifies only specific ones of the network devices matching the selected filter criteria items. That is, after a particular filter criteria item has been selected, the processing part 27*c* filters the device information and/or device list to determined specific ones of the network devices matching the selected filter criteria items. The processing part 27*c* then generates a device list indicating these specific ones of the network devices matching the selected filter criteria items, and optionally indicating one or more device properties corresponding to each of these network devices. The processing part 27*c* then causes the user interface part 27*b* to display the device list in a user interface screen on a display part of the apparatus 27.

FIG. 4*b* illustrates an example of a (revised) device list generated by the processing part 27*c*, and displayed on a user interface screen of the apparatus 27 by the user interface part 27*b*. As illustrated in FIG. 4B, the selected filter criteria item is "XYZ-Brand" in the Manufacturer filter block of the filter pane. Thus, the processing part has processed the device information in FIG. 3 to generate the revised device list indicating only specific ones of the network devices having "XYZ Brand" as a manufacturer property. In the example of FIGS. 4A and 4B, only the two devices XYZ Brand D11 and XYZ Brand 25F have "XYZ Brand" as a manufacturer property.

Thus, according to this exemplary embodiment, the monitoring apparatus generates a device list indicating only specific ones of a plurality of network devices matching a selected filter criteria item. In this way, an IT administrator is able to quickly identify network devices that satisfy a particular property, and the administrator is not overwhelmed with non-relevant information regarding a large number of network devices.

The information depicted in FIG. 3 is merely exemplary, and other network devices and/or device properties may be included in the device information. Further, the monitoring apparatus 27 may include a user interface configured to allow an administrator to change the device information as desired. As non-limiting examples, the device information may also specify one of more of the following device properties for a given device: device location (physical address, geographic address, network address, IP address, MAC address, etc.); output technology (e.g., laser, inkjet solid ink, thermal, other technology, etc.); device location type (e.g., production/copy center, in a specific workgroup area, etc.); scope (e.g., within the scope of administrative responsibility of a particular IT administrator, outside the scope of administrative responsibility of particular IT administrator, etc.); connection type (e.g., network connected, workstation/local connected, non-connected, etc.); device age (e.g., <1 year, 1-2 years, 2-3 years, 3-4 years, 4-5 years, >5 years, etc.); functions (e.g., copy, fax, print, scan, copy/scan, copy/fax, copy/print, print/fax, print/scan, copy/print/fax, copy/print/scan, copy/print/fax/scan, etc.); firmware version (e.g., major version, minor version, etc.); installed applications (e.g., application name, major version, etc.); organization (e.g., different groups, sub-groups, levels, departments, divisions and so forth within a larger enterprise or institutional entity, such as management group, sales group, marketing group, research & development group, etc.); supply level (e.g., consumable types>empty/low/ok, etc.); capability (e.g., color, economy color, monochrome only, color scan, duplex, A3, not A3, etc.); last status update (e.g., 10 minutes, 60 minutes, 6 hours, etc.); duplex usage (e.g., 2:1, 1:2, 2:2, Book Duplex, etc.); paper size usage (e.g., A3, A4, B4, etc.); pages per job (e.g., 1, 2, 6-10, etc.); pages per minute (PPM) range (e.g., 1-20 ppm, 41+ ppm, etc.); color technology (e.g., professional color, convenience color, etc.); audit results/analysis (e.g., devices which satisfied a particular audit or test, devices which did not satisfy a particular audit or test, etc.); and so forth.

The monitoring apparatus of this disclosure may be realized by a computer program product including a computer-usable, non-transient medium (such as a disk storage apparatus) having instructions tangibly embodied therein that are executed by a computer. Thus, it should be understood that the monitoring apparatus may be executed on a computer. While the monitoring apparatus is shown as being external to the network devices, the monitoring may in fact be performed, at least in part, on a client terminal and/or network-connected device.

The monitoring apparatus may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

The network 21 can include one or more of a secure intranet or extranet local area network, a wide area network, any type of network that allows secure access, etc., or a combination thereof. Further, other secure communications links (such as a virtual private network, a wireless link, etc.) may be used as well in the network 21. In addition, the network 21 preferably uses TCP/IP (Transmission Control Protocol/Internet Protocol), but other protocols can also be used. How devices can connect to and communicate over the network 21 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 5:
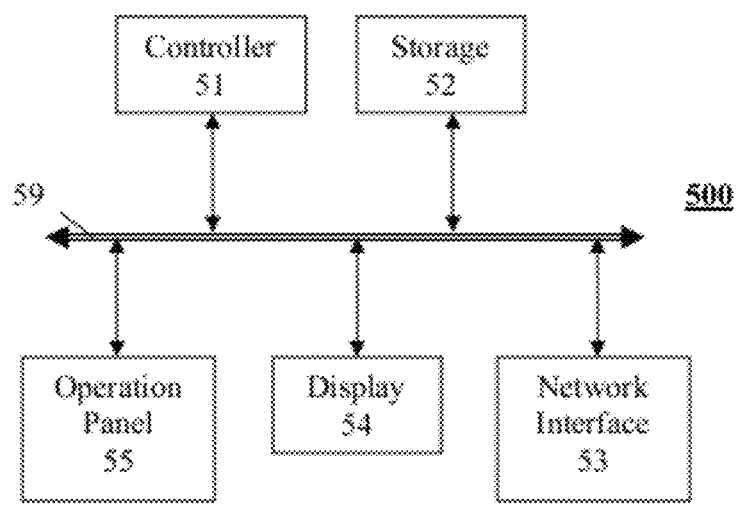
FIG. 5 shows a block diagram of an exemplary configuration of a computer that can be used to implement a monitoring apparatus, such as monitoring apparatus 27 of FIG. 2.

FIG. 5 shows an exemplary constitution of a monitoring apparatus 500 as a computer, for example, that can be configured through software to provide the monitoring apparatus 27 of FIG. 2. As shown in FIG. 5, the monitoring apparatus 500 includes a controller (or central processing unit) 51 that communicates with a number of other components, including memory or storage part 52, network interface 53, display 54 and operation panel 55, by way of a system bus 59.

The monitoring apparatus 500 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In monitoring apparatus 500, the controller 51 executes program code instructions that controls device operations. The program code instructions may be stored in memory/storage 52, which may be a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives, and so forth The display part 54 includes a display screen that displays information to the user of the device 500. The display screen can be any of various conventional displays (such as a liquid crystal display, a plasma display device, a cathode ray tube display, etc.), or may be equipped with a touch sensitive display (for example, liquid crystal display), and configured to provide the GUI based on information input by an operator of the device, so as to allow the operator to conveniently take advantage of the services provided by the system. The operation panel 55 may include a keyboard with keys for inputting information or requesting various operations. Alternatively, the operation panel 55 and/or the display 54 may be operated by a keyboard, a mouse, a remote control, touching the display screen of the display 54, voice recognition, or eye-movement tracking, or a combination thereof.

Other aspects of the controller 51, memory/storage 52, network interface 53, display 54 and keyboard 55 are conventional, and therefore in order to avoid occluding the inventive aspects of this disclosure, such conventional aspects will not be discussed in detail herein.

The monitoring apparatus 500 includes the network interface 53 for communications through a network, such as communications through the network 51 with the network devices 25-1 through 25-4 in FIG. 2. However, it should be appreciated that the subject matter of this disclosure is not limited to such configuration. For example, the monitoring apparatus 500 may communicate with client terminals through direct connections and/or through a network to which some components are not connected. As another example, the monitoring apparatus 500 need not be provided by a server that services terminals, but rather may communicate with the devices on a peer basis, or in another fashion.

As mentioned above, monitoring apparatus 27 is not limited to a server or computer, but can be manifested in any of various devices that can be configured to communicate over a network and/or the Internet.

Each of the network-devices 25-1 through 25-n may be a network-connected device including but not limited to a personal, notebook or workstation computer, a terminal, a kiosk, a PDA (personal digital assistant), a tablet computing device, a smartphone, a scanner, a printer, a facsimile machine, a multi-function device (MFD), a server, a mobile phone or handset, another information terminal, etc. Each network device may be configured with software allowing the network device to communicate through the network 21 with monitoring apparatus 27.

The multi-function device 25-3 itself may be any apparatus (including a microprocessor chip or a collection of devices having varying degrees of integration) that has the ability to perform two or more functionalities. The multi-function device 25-3 may be a terminal or any computing device including but not limited to a personal, notebook or workstation computer, a kiosk, a PDA (personal digital assistant), a tablet computing device, a smartphone, a scanner, a printer, a facsimile machine, a server, a mobile phone or handset, another information terminal, etc. The multi-function device 25-3 is configured with software allowing the multi-function device 25-3 to communicate through the network 21 with monitoring apparatus 27.

Figure 6:
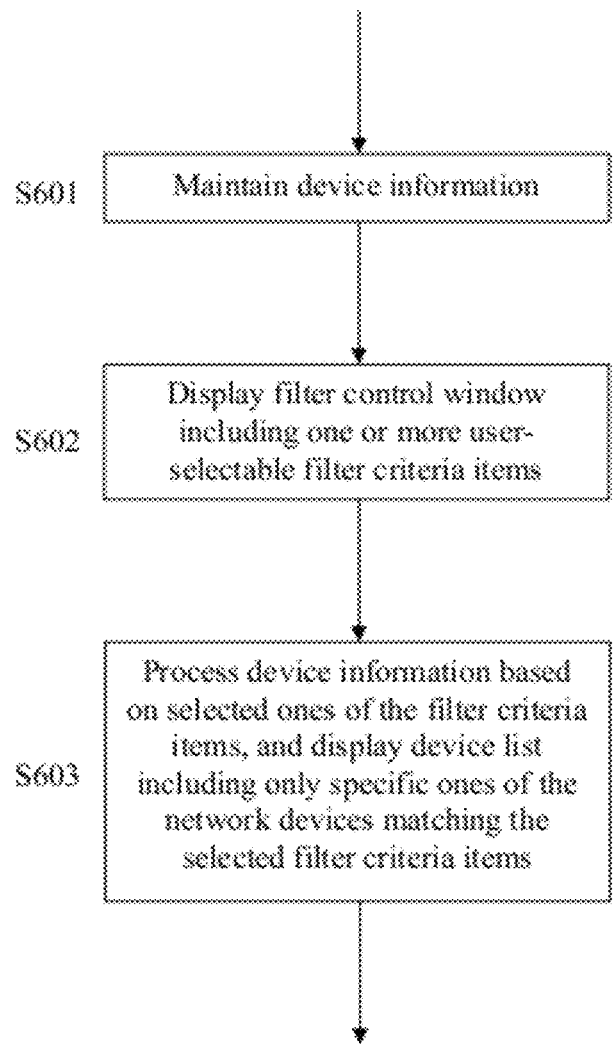
FIG. 6 shows a flowchart of a method performed by a monitoring apparatus, such as monitoring apparatus 27 illustrated in FIG. 2, according to an exemplary embodiment.

Turning now to FIG. 6, there is shown a flowchart of a method performed by a monitoring apparatus (such as apparatus 27 illustrated in FIG. 2) according to an exemplary embodiment.

In S601, the monitoring apparatus maintains device information including, for each of a plurality of network devices, device properties and status of the network devices. For example, the monitoring apparatus may obtain the device information (including the device properties information and status information for each network device) from the plurality of devices via a network, and may utilize a directory service to store and manage the device information. An example of device information maintained by the monitoring apparatus is illustrated in FIG. 3. In S602, the monitoring apparatus causes a user interface to display a filter control window including one or more user-selectable filter criteria items. An example of a user interface screen including a filter control is depicted in FIG. 4A. In S603, the monitoring apparatus processes the device information based on selected ones of the filter criteria items, and causes the user interface to display a device list that identifies only specific ones of the network devices matching the selected ones of the filter criteria items. An example of a user interface screen including a device list is depicted in FIG. 4B.

According to another exemplary embodiment, the user interface part 27b of the monitoring apparatus 27 displays a plurality of filter blocks in the filter control window, each filter block including one or more related filter criteria items. FIG. 7A depicts an example of a user interface screen displayed on a display part of the monitoring apparatus 27, similar to the screen illustrated in FIG. 4A, except that a plurality of filter blocks are included the filter control window. Each of the plurality of filter blocks includes one or more related filter criteria items. For example, the filter criteria items Ready, Paper Jam, Out of Paper and Toner Out are included in a filter block labeled "Status", indicating that these filter criteria items may be used to filter the device information and/or information in the device list, based on the criteria related to a "Status" property of a network device. Similarly, the filter criteria items Printer, Fax, MFD and Scanner are included in a filter block labeled "Type", indicating that these filter criteria items may be used to filter the device information and/or information in the device list, based on the criteria related to a "Type" property of a network device.

According to this exemplary embodiment, if more than one filter criteria item in a particular filter block is selected, then the processing part 27c will process the device information and/or device list based on the selected filter criteria items, and generate a device list indicating only network devices that match at least one of the selected filter criteria items. For example, FIG. 7B illustrates a device list generated after both the Ricoh and ABCD_Brand filter criteria items in the same Manufacturer filter block have been selected. As seen in FIG. 7B, the processing part has filtered the device information and/or device information, to generate a device list indicating only network devices having a Manufacturer property that matches at least one of the selected filter criteria items Ricoh and ABCD_Brand (i.e. devices that match either filter criteria item Ricoh or filter criteria item ABCD_Brand).

According to an aspect of this exemplary embodiment, if filter criteria items in different filter blocks are selected, then the processing part 27c will process the device information and/or device list based on the selected filter criteria items, and generate a device list indicating only network devices that match at least one selected filter criteria item from each of the filter blocks having one or more selected filter criteria items.

For example, FIG. 7C illustrates a device list generated after both the Ricoh and ABCD_Brand filter criteria items in the same Manufacturer filter block have been selected, and the Out of Paper filter criteria item in the Status filter block has been selected. As seen in FIG. 7C, the processing part has filtered the device information and/or device information, to generate a device list indicating only network devices having a Manufacturer property that matches at least one of the selected filter criteria items Ricoh and ABCD_Brand in the Manufacturer block, and having a Status property that matches the selected filter criteria item Out of Paper in the Status block. Similarly, FIG. 7D illustrates a device list generated after both the Ricoh and ABCD_Brand filter criteria items in the same Manufacturer filter block have been selected, and the Out of Paper filter criteria item in the Status filter block has been selected and the Printer filter criteria item in the Type filter block has been selected. As seen in FIG. 7D, the processing part has filtered the device information and/or device information, to generate a device list indicating only network devices having a Manufacturer property that matches at least one of the selected filter criteria items Ricoh and ABCD_Brand in the Manufacturer block, having a Status property that matches the selected filter criteria item Out of Paper in the status block, and having a Type property that matches the selected filter criteria item Printer in the Type block. Thus, the processing part 27c generates a device list indicating only network devices that match at least one selected filter criteria item from each of the filter blocks having one or more selected filter criteria items.

According to another aspect of this exemplary embodiment, after filter criteria items have been selected, the processing part not only generates a device list, but also generates revised filter blocks, based on the selected filter criteria items and on the sequence in which the filter blocks are displayed in the filter control window.

Referring back to the user interface screen of FIG. 7A, the filter blocks are displayed in a specific sequence or order in the filter control window. More particularly, the specific sequence in which the filter blocks are displayed is Manufacturer→Status→Type, in a downward vertical direction in the filter control window.

According to this aspect, if one or more filter criteria items in a first filter block are selected, the processing part 27c modifies all of the filter blocks appearing after the first filter block in the specific sequence. In particular, the processing part generates modified filter blocks including only filter criteria items applicable to network devices that satisfy at least one of the (one or more) selected filter criteria items in the first filter block.

Referring to FIG. 7B for example, after the Ricoh and ABCD_Brand filter criteria items in the Manufacturer filter block have been selected, the filter criteria items in the Status filter block include only filter criteria items applicable to network devices that satisfy either the Ricoh or ABCD_Brand filter criteria items in the Manufacturer filter block. With reference to the device information of FIG. 3 (or the device list of FIG. 7A), since none of the network devices satisfying the Ricoh or ABCD_Brand filter criteria have a Status property of Toner Out, the Toner Out filter criteria item has been removed from the Status filter block, as seen in FIG. 7B. Likewise, since none of the network devices satisfying the Ricoh or ABCD_Brand filter criteria have a Type property of Scanner, the Scanner filter criteria item has been removed from the Type filter block, as seen in FIG. 7B.

Referring to FIG. 7C as another example, after the Ricoh and ABCD_Brand filter criteria items in the Manufacturer filter block have been selected, and the Out of Paper filter criteria item in the Status filter block has been selected, the filter criteria items in the Type filter block include only filter criteria items applicable to network devices that satisfy (a) either the Ricoh or ABCD_Brand filter criteria items in the Manufacturer filter block and (b) the Out of Paper filter criteria item in the Status filter block. With reference to the device information of FIG. 3 (or the device list of FIG. 7B), since none of the network devices satisfying (a) the Ricoh or ABCD_Brand filter criteria items and (b) the Out of Paper filter criteria item have a Type property of Fax, the Fax filter criteria item has been removed from the Type filter block, as seen in FIG. 7C. (Note that all of the filter criteria items in the Status and Type filter blocks of FIG. 7C still satisfy the selected filter criteria items in the Manufacturer block, which appears first in the specific sequence in which the filter blocks are display in the filter control window).

Thus, according to this aspect, if one or more filter criteria items in a first filter block are selected, the processing part 27c modifies all of the filter block appearing after the first filter block in the specific sequence, to generate modified filter blocks including only filter criteria items applicable to network devices that satisfy at least one of the (one or more) selected filter criteria items in the first filter block.

According to another aspect, the processing part 27c causes the user interface part 27b to display, for each of the filter criteria items, a corresponding device count corresponding to a number of the network devices that match the filter criteria item. This can be seen with reference to the example of FIG. 7A, where it is indicated that 5 network devices match the Ricoh filter criteria item in the Manufacturer filter block, 2 network devices match the MFD filter criteria item in the Type filter block, and so forth.

More particularly, for each of the filter criteria items in a first filter block, the user interface part may display a device count corresponding to a number of the network devices that match that filter criteria item, and also match at least one of the selected filter criteria items from each of the filter blocks (having one or more selected filter criteria items) that appear before the first filter block in the specific sequence.

With reference to the example of FIG. 7B, after the Ricoh and ABCD_Brand filter criteria items in the Manufacturer filter block have been selected, the device counts for each of the filter criteria items in the Status and Type filter blocks have been changed to reflect only the number of devices that satisfy that criteria item, and also satisfy at least one of the selected Ricoh and ABCD_Brand filter criteria items from the Manufacturer filter block (which appears before the Status and Type filter blocks in the specific sequence in which the filter blocks are displayed in the filter control window). For example, only 4 devices match the Ready filter criteria item, as well as either the Ricoh or ABCD_Brand filter criteria item.

Similarly, with reference to the example of FIG. 7C, after the Ricoh and ABCD_Brand filter criteria items in the Manufacturer filter block have been selected, and the Out of Paper filter criteria item in the Status filter block as been selected, the device counts for each of the filter criteria items in the Type filter block have been changed to reflect only the number of devices that satisfy that criteria item, and also satisfy (a) at least one of the selected Ricoh and ABCD_Brand filter criteria items from the Manufacturer filter block and (b) the Out of Paper filter criteria item in the Status filter block (where both the Manufacturer and Status filter blocks appear before the Type filter block in the specific sequence in which the filter blocks are displayed in the filter control window). For example, only 1 device match the MFD filter criteria item and the Out of Paper filter criteria item and either the Ricoh or ABCD_Brand filter criteria item.

Thus, according to this aspect, for each of the filter criteria items in a first filter block, the user interface part may display a device count corresponding to a number of the network devices that match that filter criteria item, and also match at least one of the selected filter criteria items from each of the filter blocks (having one or more selected filter criteria items) that appear before the first filter block in the specific sequence.

Figure 8:
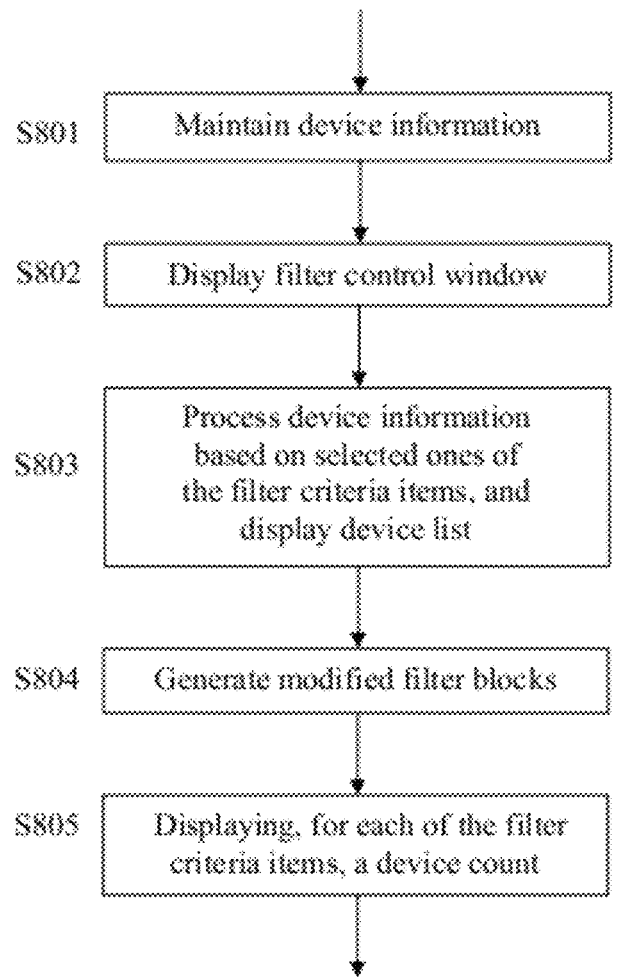
FIG. 8 shows a flowchart of a method performed by a monitoring apparatus, such as monitoring apparatus 27 illustrated in FIG. 2, according to another exemplary embodiment.

Turning now to FIG. 8, there is shown a flowchart of a method performed by a monitoring apparatus (such as apparatus 27 illustrated in FIG. 2), according to this exemplary embodiment.

In S801, the monitoring apparatus maintains device information including, for each of a plurality of network devices, device properties and status of the network devices. An example of device information maintained by the monitoring apparatus is illustrated in FIG. 3. In S802, the monitoring apparatus causes a user interface to display a filter control window. The filter control window includes one or more filter blocks displayed in a specific order, wherein each filter block includes one or more related filter criteria items. An example of a user interface screen including a filter control window is depicted in FIG. 7A.

In S803, the monitoring apparatus determines that one or more filter criteria items in a first filter block have been selected. The monitoring apparatus processes the device information based on selected ones of the filter criteria items, and causes the user interface to display a device list that identifies only specific ones of the network devices matching at least one selected filter criteria item (from each of the filter blocks having one or more selected filter criteria items, such as the first filter block). In S804, the monitoring apparatus modifies all of the filter blocks appearing after the first filter block in the specific sequence, to generate modified filter blocks including only filter criteria items applicable to network devices that satisfy at least one of the (one or more) selected filter criteria items in the first filter block. In S805, the monitoring apparatus displays, for each of the filter criteria items in a given filter block, a device count corresponding to a number of the network devices that match the filter criteria item, and match at least one of the selected filter criteria items from each of the filter blocks (having one or more selected filter criteria items) that appear before the given filter block in the specific sequence.

Turning now to FIGS. 9A-9D, there is described another exemplary embodiment.

According to this exemplary embodiment, the specific sequence in which the filter blocks are displayed in the filter control window may be changed. In particular, a given filter block may be removed from the filter control window when the processing part 27c recognizes a particular input (such as a cursor drag-and-drop operation wherein the given filter block is selected and dragged to (and dropped) outside of the filter control window). As a result, the removed filter block is no longer displayed in the filter control window, and the remaining filter blocks are displayed in a new specific sequence.

For example, FIG. 9A illustrates the same user interface screen as depicted in 7D, which may be displayed on a display part of the monitoring apparatus 27 by the user interface part 27b. If the user performs a drag-and-drop operation to remove the Type filter block from the filter control window, then the user interface screen of FIG. 9B will be displayed. As seen in FIG. 9B, the processing part 27c has caused the user interface part 27b to remove the Type filter block from the filter control window (as the result of a drag-and-drop operation). The remaining filter blocks are displayed in a new specific sequence Manufacturer→Status, where the filter block Type is no longer in the specific sequence.

Moreover, after the Type filter block has been dragged out of the filter control window, it can be seen that the processing part has updated the device list accordingly, to include only specific ones of the network devices matching at least one selected filter criteria item from each of the remaining filter blocks (having one or more filter criteria items). That is, the revised device list in FIG. 9B includes only specific ones of the network devices satisfying (a) the Ricoh or ABCD_Brand filter criteria item and (b) the Out of Paper filter criteria item, regardless of whether these devices satisfy any filter criteria items from the now-removed Type filter block. Thus, an effect of the removal of the Type filter block from the filter control window is that the processing apparatus effectively 'unselects' all of the filter criteria items that were selected in the Type filter block.

As another example, if the user performs a drag-and-drop operation to remove the Status filter block from the filter control window illustrated in FIG. 9A, then the user interface screen of FIG. 9C will be displayed. As seen in FIG. 9C, the processing part 27c has caused the user interface part 27b to remove the Status filter block from the filter control window (as the result of a drag-and-drop operation). The remaining filter blocks are displayed in a new specific sequence Manufacturer→Type, where the Status filter block is no longer in the specific sequence. Moreover, after the Status filter block has been dragged out of the filter control window, it can be seen that the processing part has updated the device list accordingly, to include only specific ones of the network devices matching at least one selected filter criteria item from each of the remaining filter blocks (having one or more filter criteria items). That is, the revised device list in FIG. 9C includes only specific ones of the network devices satisfying (a) the Ricoh or ABCD_Brand filter criteria and (b) the Printer filter criteria, regardless of whether these devices satisfy any filter criteria items from the now-removed Status filter block. Thus, the processing apparatus has effectively 'unselected' all of the filter criteria items that were selected in the Status filter block.

As a further example, if the user performs a drag-and-drop operation to remove the Manufacturer filter block from the filter control window illustrated in FIG. 9A, then the user interface screen of FIG. 9D will be displayed. As seen in FIG. 9D, the processing part 27c has caused the user interface part 27b to remove the Manufacturer filter block from the filter control window (as the result of a drag-and-drop operation). The remaining filter blocks are displayed in a new specific sequence Status→Type, where the Manufacturer filter block is no longer in the specific sequence. Moreover, after the Manufacturer filter block has been dragged out of the filter control window, it can be seen that the processing part has updated the device list accordingly, to include only specific ones of the network devices matching at least one selected filter criteria item from each of the remaining filter blocks (having one or more filter criteria items). That is, the revised device list in FIG. 9D includes only specific ones of the network devices satisfying (a) the Out of Paper filter criteria item and (b) the Printer filter criteria item, regardless of whether these devices satisfy any filter criteria items from the now-removed Manufacturer filter block. Thus, the processing apparatus has effectively 'unselected' all of the filter criteria items that were selected in the Manufacturer filter block.

Thus, according to this exemplary embodiment, if a first filter block is dragged out of the filter control window via a drag-and-drop operation, then the processing part unselects all of the filter control items of the first filter block, and processes the device information based on selected filter criteria items in each of the remaining filter blocks in the filter control window, to generate the revised device list. In this way, an administrator does not have to unselect each and every filter criteria item in a filter block, if the administrator no longer desires to filter the device list based on any criteria in that filter block.

According to this exemplary embodiment, the processing part may also revise the content of the remaining filter blocks in accordance with other aspects of this disclosure.

For example, when one or more filter criteria items in a first remaining filter block are selected, the processing part modifies all of the remaining filter blocks appearing after the first remaining filter block in the specific sequence, to generate modified filter blocks including only filter criteria items applicable to network devices that satisfy at least one of the (one or more) selected filter criteria items in the first remaining filter block.

With reference to the example of FIG. 9C, after the Status filter block is removed from the filter control window illustrated in FIG. 9A, it can be seen that the content of the Type filter block has been revised accordingly. That is, the Type filter block now includes all filter criteria items (such as the fax filter criteria item) applicable to devices that satisfy either the Ricoh or ABCD_Brand filter criteria items, regardless of whether these devices satisfy any Status filter block criteria.

Further, it can be seen that for each of the filter criteria items in a given remaining filter block, the user interface part displays a device count corresponding to a number of the network devices that match the filter criteria item, and match at least one of the selected filter criteria items from each of the remaining filter blocks (having one or more selected filter criteria items) that appear before the given filter block in the specific sequence.

With reference to the example of FIG. 9C, after the Status filter block is removed from the filter control window illustrated in FIG. 9A, it can be seen that the device counts of the Type filter block has been revised accordingly. For example, the device count "5" indicates the number of devices that satisfy (a) either the Ricoh or ABCD_Brand filter criteria items and (b) the Printer criteria item, regardless of whether these devices satisfy any Status filter block criteria.

Figure 10:
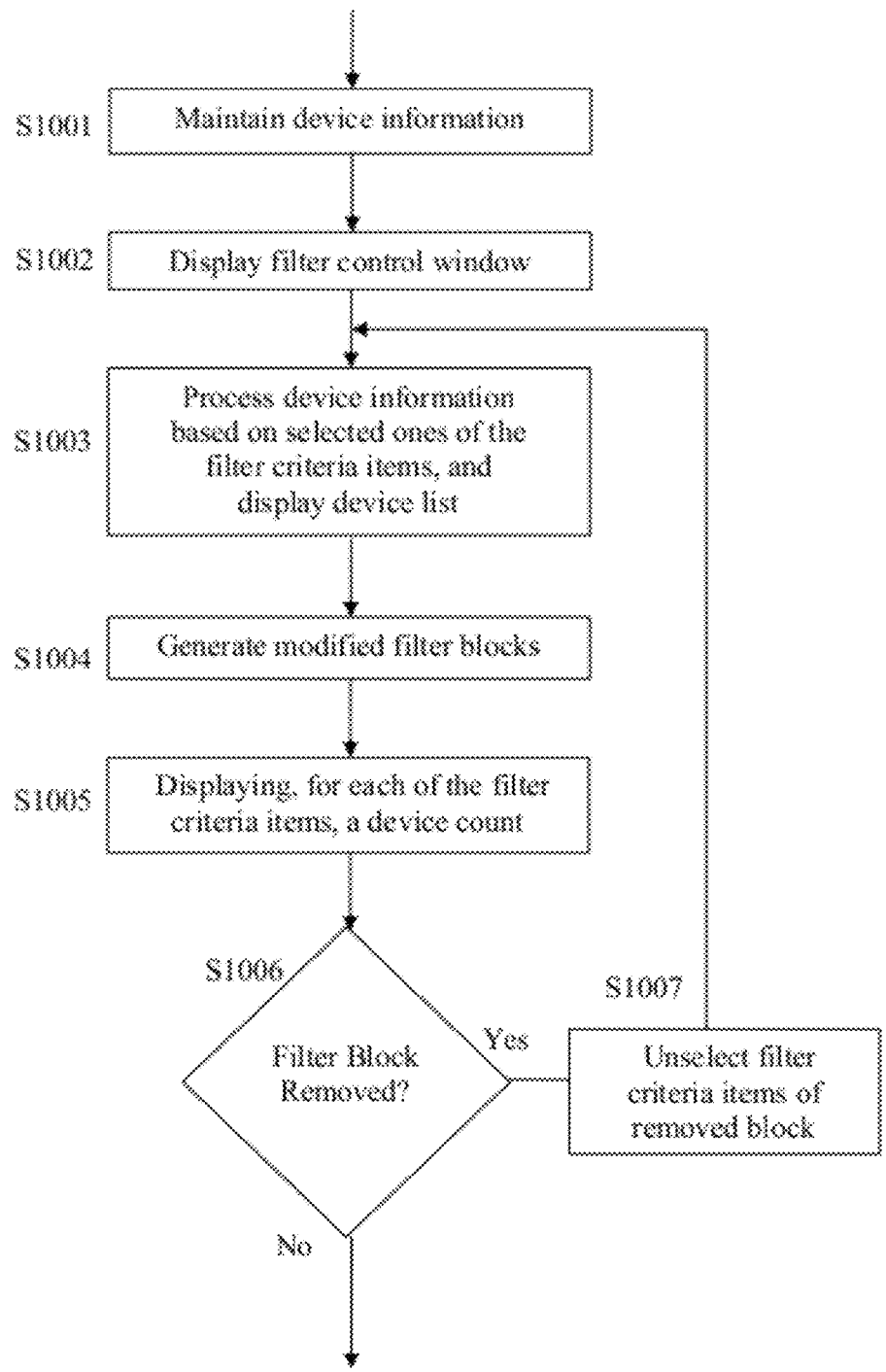
FIG. 10 shows a flowchart of a method performed by a monitoring apparatus, such as monitoring apparatus 27 illustrated in FIG. 2, according to another exemplary embodiment.

Turning now to FIG. 10, there is shown a flowchart of a method performed by a monitoring apparatus (such as apparatus 27 illustrated in FIG. 2), according to this exemplary embodiment. Steps S1001-S1005 are substantially similar to S801-S805 of FIG. 8. In S1006, the monitoring apparatus determines whether a filter block has been removed from the filter control window, in response to a user input, for example. If the monitoring apparatus determines that a filter block has not been removed (S1006, No), the flow ends. If the monitoring apparatus determines that a filter block has been removed (S1006, Yes), then in S1007 the monitoring apparatus unselects all of the filter control items of the removed filter block (i.e. the remove filter block is no longer considered when processing the device information and/or device list), and the flow returns to S1003.

Turning now to FIGS. 11A-11B, there is described another exemplary embodiment.

According to this exemplary embodiment, the specific sequence in which the filter blocks are displayed in the filter control window may be rearranged when the processing part 27c recognizes a particular input (such as a cursor drag-and-drop operation wherein the positions of the filter blocks within the filter control window is changed).

For example, FIG. 11A illustrates the same user interface screen as depicted in 7C, which may be displayed on a display part of the monitoring apparatus 27 by the user interface part 27b. If the processing part determines that the Status filter block is to be moved above the Manufacturer filter block (in response to user input, such as a drag-and-drop operation), then the user interface screen of FIG. 11B may be displayed. As seen in FIG. 11B, the processing part 27c has caused the user interface part 27b to move the Status filter block above the Manufacturer filter block (as the result of a drag-and-drop operation). The filter blocks are displayed in a new specific sequence Status→Manufacturer→Type.

Moreover, after the filter blocks have been rearranged, the device list has not been changed, since the selected criteria items have not been changed. That is, the device list generated by the processing part 27c and displayed by the user interface part 27b still identifies only network devices matching at least one selected filter criteria item from each of the filter blocks having one or more selected filter criteria items.

According to this exemplary embodiment, the processing part revises the contents of the rearranged filter blocks in accordance with other aspects of this disclosure. For example, when one or more filter criteria items in a first filter block are selected, the processing part modifies all of the filter blocks appearing after the first filter block in the specific sequence, to generate modified filter blocks including only filter criteria items applicable to network devices that satisfy at least one of the (one or more) selected filter criteria items in the first filter block.

With reference to the example of FIG. 11B, after the Status filter block is moved above the Manufacturer filter block, the Status filter block is now at the head of the specific sequence, and thus represents the first/highest criteria for filtering the device information and/or device list. Thus, the Status filter block displays all possible filter criteria items associated with the Status block (including, for example, the Toner Out filter criteria item). In contrast, the Manufacturer filter block now includes only filter criteria items (i.e. only the Ricoh and ABCD_Brand filter criteria items) applicable to devices that satisfy the selected Out of Paper filter criteria item in the Status filter block.

Further, it can be seen that for each of the filter criteria items in the filter blocks, the user interface part displays a device count corresponding to a number of the network devices that match the filter criteria item, and match at least one of the selected filter criteria items from each of the filter blocks (having one or more selected filter criteria items) that appear before the given filter block in the specific sequence.

With reference to the example of FIG. 11B, after the Status filter block is moved above the Manufacturer filter block, it can be seen that the device counts of the Status and Manufacturer filter blocks has been revised accordingly. For example, the device count "5" indicates the number of devices that satisfy the Ready criteria item in the Status filter block, regardless of whether these devices satisfy any other filter block criteria. Similarly, the device count "1" indicates the number of devices that satisfy the Ricoh filter criteria item in the Manufacturer filter block as well as matching the selected Out of Paper filter criteria item in the Status filter block (which appears before the Manufacturer block in the new specific sequence in which the filter blocks are displayed in the filter control window).

Figure 12:
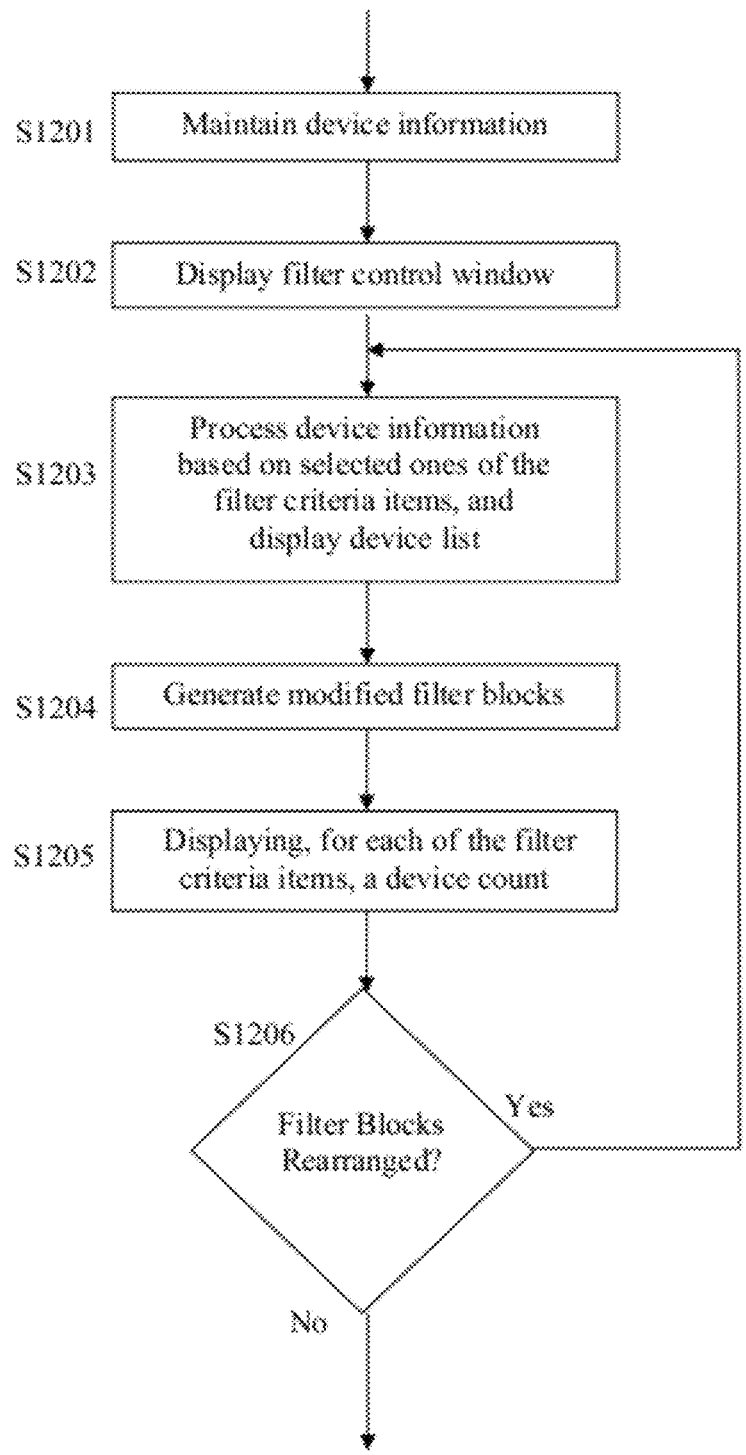
FIG. 12 shows a flowchart of a method performed by a monitoring apparatus, such as monitoring apparatus 27 illustrated in FIG. 2, according to another exemplary embodiment.

Turning now to FIG. 12, there is shown a flowchart of a method performed by a monitoring apparatus (such as apparatus 27 illustrated in FIG. 2), according to this exemplary embodiment. Steps S1201-S1205 are substantially similar to S801-S805 of FIG. 8. In S1206, the monitoring apparatus determines whether the filter blocks have been rearranged in the filter control window, in response to a user input, for example. If the monitoring apparatus determines that the filter blocks have not been rearranged (S1206, No), the flow ends. If the monitoring apparatus determines that the filter blocks have been rearranged (S1206, Yes), then the flow returns to S1203.

Turning now to FIGS. 13A-13C, there is described another exemplary embodiment.

According to this exemplary embodiment, a new filter block may be added to the filter control window at a specific position, and the specific sequence in which the filter blocks are displayed in the filter control window will be updated. This occurs when the processing part 27c recognizes a particular input.

For example, FIG. 13A illustrates the same user interface screen as depicted in 7C, which may be displayed on a display part of the monitoring apparatus 27 by the user interface part 27b. After the user selects an 'Add New Filter Block' button (not shown in FIG. 13A), the user interface part 27b displays a new filter block palette on a user interface screen, an example of which is depicted in FIG. 13B. The user may select the new filter block by, for example, clicking on the corresponding new filter block in the list, and/or dragging the name of the desired filter block from the list to a specific position in the filter control window.

Some non-limiting examples of filter blocks and related filter criteria are: device location (physical address, geographic address, network address, IP address, MAC address, etc.); output technology (e.g., laser, inkjet solid ink, thermal, other technology, etc.); device location type (e.g., production/copy center, in a specific workgroup area, etc.); scope (e.g., within the scope of administrative responsibility of particular IT administrator, outside the scope of administrative responsibility of particular IT administrator, etc.); connection type (e.g., network connected, workstation/local connected, non-connected, etc.); device age (e.g., <1 year, 1-2 years, 2-3 years, 3-4 years, 4-5 years, >years, etc.); functions (e.g., copy, fax, print, scan, copy/scan, copy/fax, copy/print, print/fax, print/scan, copy/print/fax, copy/print/scan, copy/print/fax/scan, etc.); firmware version (e.g., major version, minor version, etc.); installed applications (e.g., application name, major version, etc.); organization (e.g., different groups, sub-groups, levels, departments, divisions and so forth within a larger enterprise or institutional entity, such as management group, sales group, marketing group, research & development group, etc.); supply level (e.g., consumable types>empty/low/ok, etc.); capability (e.g., color, economy color, monochrome only, color scan, duplex, A3, not A3, etc.); last status update (e.g., 10 minutes, 60 minutes, 6 hours, etc.); duplex usage (e.g., 2:1, 1:2, 2:2, Book Duplex, etc.); paper size usage (e.g., A3, A4, B4, etc.); pages per job (e.g., 1, 2, 6-10, etc.); pages per minute (PPM) range (e.g., 1-20 ppm, 41+ ppm, etc.); color technology (e.g., professional color, convenience color, etc.); audit results/analysis (e.g., devices which satisfied a particular audit or test, devices which did not satisfy a particular audit or test, etc.); and so forth. Other filter blocks and filter criteria may be used.

If the processing part determines that, for example, a Location filter block is to be added to the filter control window of FIG. 13A at a specific position below the Type filter block (in response to user input, such as a drag-and-drop operation), then the user interface screen of FIG. 13C may be displayed. As seen in FIG. 13C, the processing part 27c has caused the user interface part 27b to include the Location filter block below the Type filter block (as the result of a drag-and-drop operation). The filter blocks are displayed in a new specific sequence Manufacturer→Status→Type→Location.

Moreover, after the new Location filter block has been added to the filter control window, the device list has not been changed, since the new Location filter block does not have any selected filter criteria items (and the selected filter criteria items of the other blocks has not been changed). That is, the device list generated by the processing part 27c and displayed by the user interface part 27b still identifies only network devices matching at least one selected filter criteria item from each of the filter blocks having one or more selected filter criteria items.

According to this exemplary embodiment, the processing part revises the contents of the filter blocks including the new filter block in accordance with other aspects of this disclosure. For example, when one or more filter criteria items in a first filter block are selected, the processing part modifies all of the filter blocks appearing after the first filter block in the specific sequence, to generate modified filter blocks including only filter criteria items applicable to network devices satisfying at least one of the (one or more) selected filter criteria items in the first filter block. With reference to the example of FIG. 13C, the Location filter block indicates only filter criteria items (i.e. only the Conference Room C and Mail Room criteria items) applicable to devices that satisfy the selected Out of Paper filter criteria item in the Status filter block and either the Ricoh or ABCD_Brand criteria item in the Manufacture filter block.

Further, it can be seen that for each of the filter criteria items in the filter blocks, the user interface part displays a device count corresponding to a number of the network devices that match the filter criteria item, and match at least one of the selected filter criteria items from each of the filter blocks (having one or more selected filter criteria items) that appear before the given filter block in the specific sequence. With reference to the example of FIG. 13C, for instance, the device count "1" indicates the number of devices that satisfy the Conference Room C filter criteria item in the Location filter block, as well as matching (a) the selected Out of Paper filter criteria item in the Status filter block and (b) either the Ricoh or ABCD_Brand filter criteria items in the Manufacturer filter block.

Figure 14:
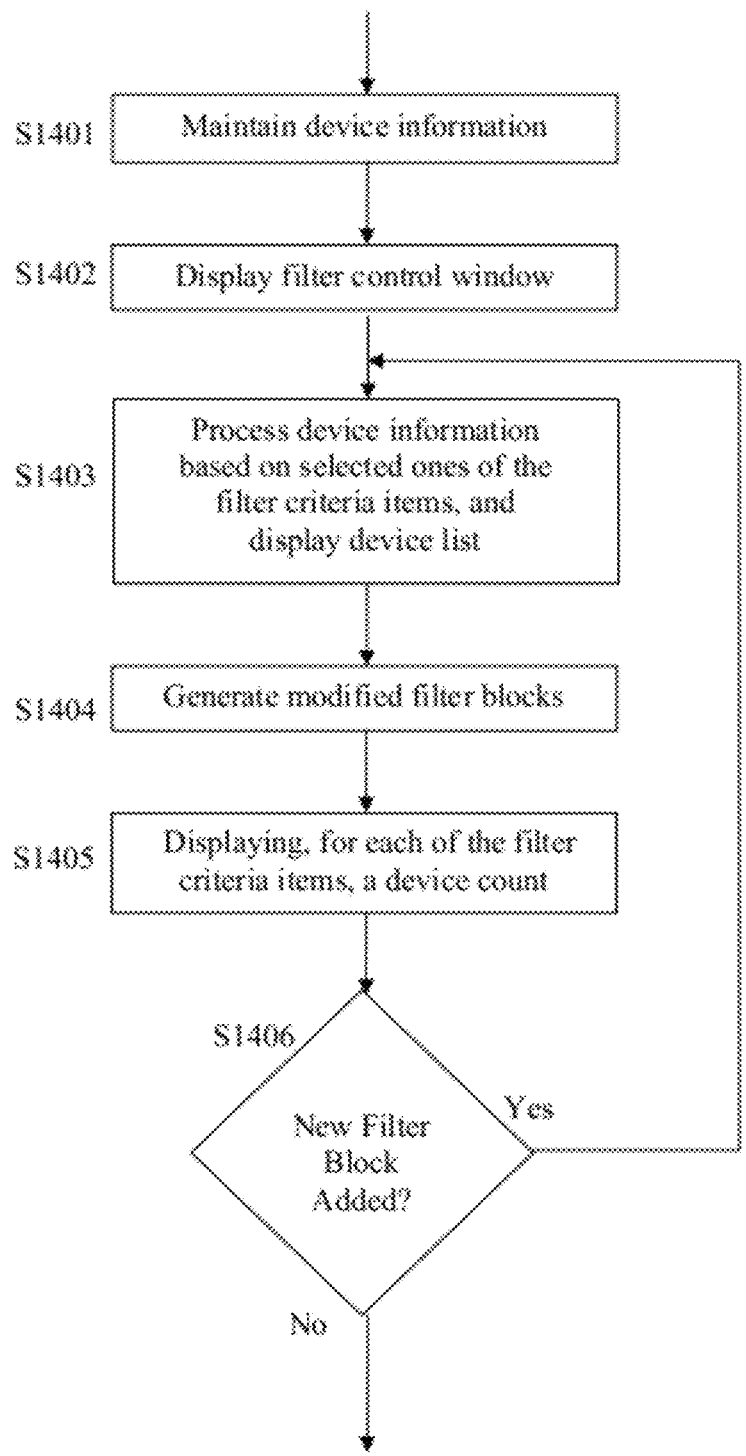
FIG. 14 shows a flowchart of a method performed by a monitoring apparatus, such as monitoring apparatus 27 illustrated in FIG. 2, according to another exemplary embodiment.

Turning now to FIG. 14, there is shown a flowchart of a method performed by a monitoring apparatus (such as apparatus 27 illustrated in FIG. 2), according to this exemplary embodiment. Steps S1401-S1405 are substantially similar to S801-S805 of FIG. 8. In S1406, the monitoring apparatus determines whether a new filter block has been added to the filter control window, in response to a user input, for example. If the monitoring apparatus determines that a new filter block has not been added (S1406, No), the flow ends. If the monitoring apparatus determines that a new filter block has been added (S1406, Yes), then the flow returns to S1403.

Figure 15:
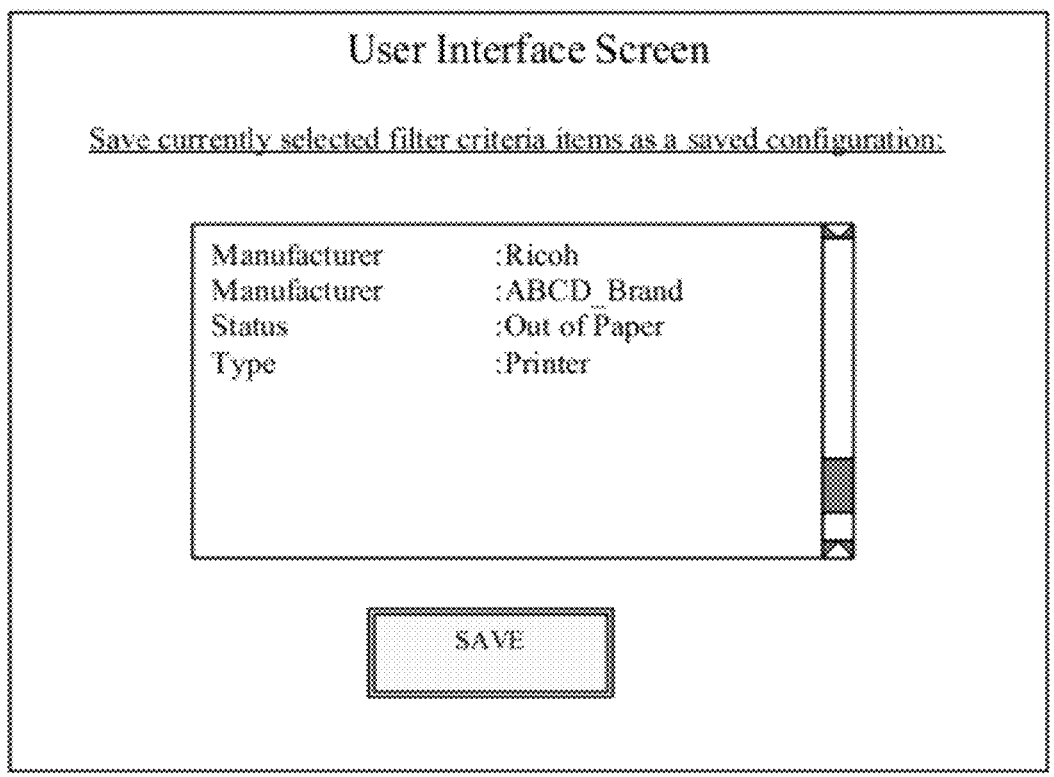
FIG. 15 illustrates an example of a user interface screen, according to another exemplary embodiment.

According to another exemplary embodiment, the user interface part is configured to allow a user to save the currently selected filter criteria items as a saved configuration. Thereafter, if the user accesses the saved configuration at a later time, the saved filter criteria items will automatically be selected in the filter control window, in order to generate a revised device list. Referring back to the user interface screen of FIG. 7D, for example, if the user wishes to save the currently selected filter criteria items as a saved configuration, then the user may click on a 'Save' button (not shown in FIG. 7D), and the user may be presented with a user interface screen such as that depicted in FIG. 15.

Once the saved configuration is generated, if the user accesses the save configuration at a later time, such as by clicking a "Load" button (not shown), the processing part 27c automatically selects the saved filter criteria items (Ricoh, ABCD_Brand, Out of Paper, and Printer) in the filter control window, and the processing part generates a revised device list indicating network devices matching the selected filter criteria items.

Turning now to FIGS. 16A-16E, there is described another exemplary embodiment.

According to this exemplary embodiment, the monitoring apparatus 27 allows a user to generate a group set filter block and associated group items, each of which are associated with a plurality of user-specified devices.

Figure 16B:
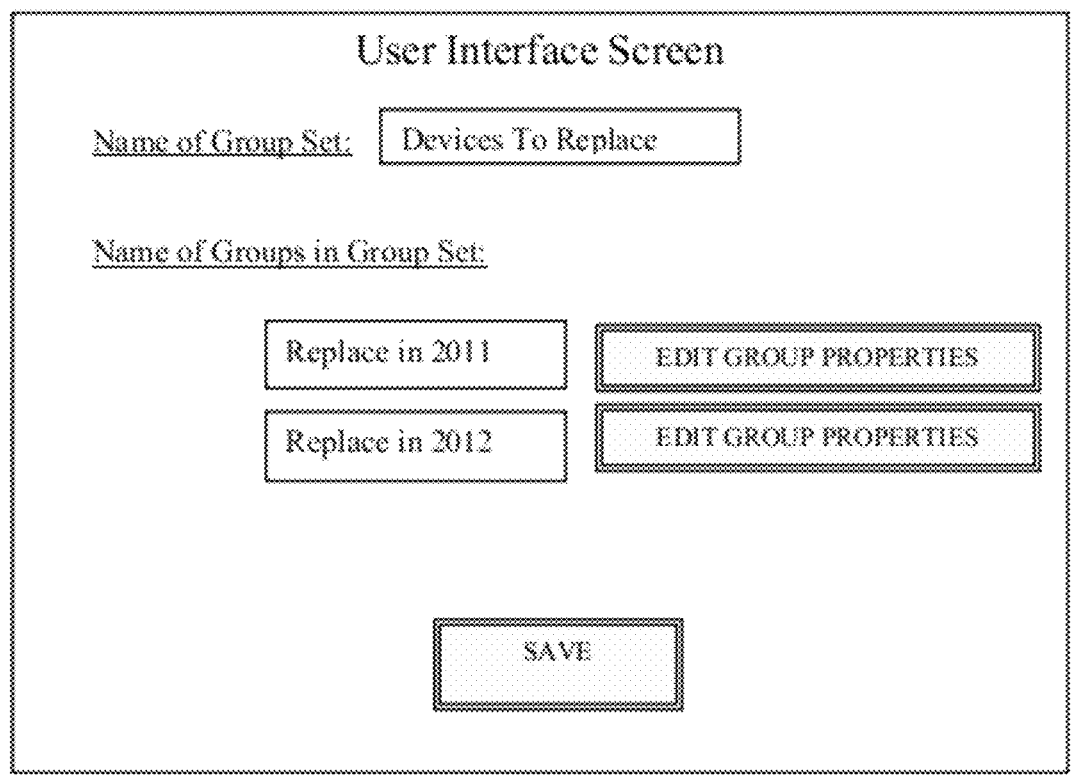

For example, FIG. 16A illustrates a user interface screen including device list, where the Ricoh filter criteria in the Manufacturer filter block has been selected. If the processing part 27c determines that a user has selected the 'Create/Edit Group Set' button, then the user interface part 27b may display the user interface screen as illustrated in FIG. 16B. The screen of FIG. 16B allows a user to name a group set filter block (e.g. "Devices to Replace") and to name a plurality of related groups items associated with the group set (e.g. "Replace in 2011", "Replace in 2012, etc.). When the user clicks on the "Edit Group Properties" button corresponding to a group item, the user interface part 27b may display the user interface screen depicted in FIG. 16C. The screen of FIG. 16C allows the user to associate one or more of the network devices with, for example, the group "Replace in 2011." According to this exemplary embodiment, the user may associate a device with the group by, for example, clicking on the name of the device in the main device list (such as Ricoh FAX5510L illustrated in FIG. 16A) and dragging the selected name to the window shown in FIG. 16C. Alternatively, the user interface part 27b may allow the user to automatically associate all the devices in the current device list with the group "Replace in 2011" by clicking on the "Use Current View of Device List" button illustrated in FIG. 16C. Thus, the processing part may generate a group set filter block and groups items corresponding to the group set filter block, based on selected filter criteria items.

As a result, processing part 27c creates a group set filter block and group items corresponding to the group set filter block, in the filter control window. For example, FIG. 16D illustrates that the group set filter block "Devices to Replace", along with group items "Replace in 2011" and "Replace in 2012" as been added to the filter control window. When one of the group items in the group set filter block is selected, the processing part 27c generates a revised device list indicating only the network devices associated with that group (or group item), as illustrated in FIG. 16E. The user may click on filter criteria items in other filter blocks to further filter the device list.

Figure 16C:
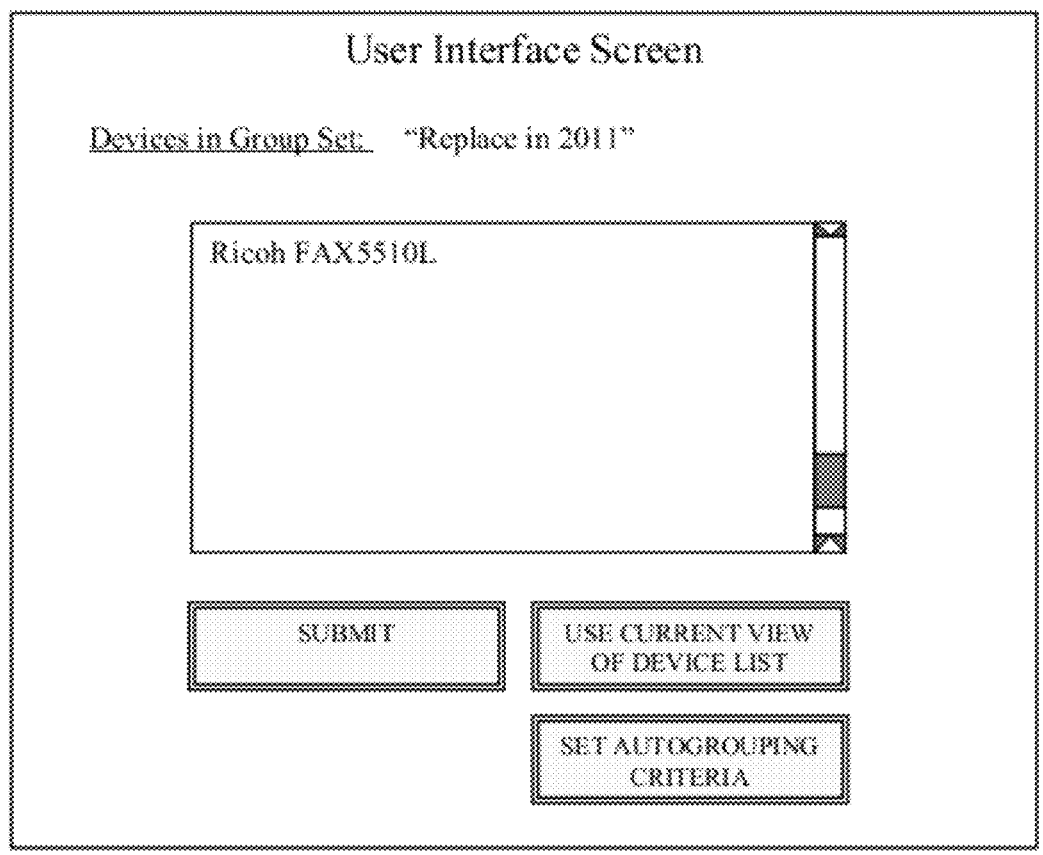

Moreover, the monitoring apparatus 27 has an auto-grouping feature that allows a user to specify an auto-grouping criteria for a specific group item (such as by clicking the "Set Autogrouping Criteria" button in FIG. 16C). In accordance with the auto-grouping feature, the processing part 27c determines whether any newly discovered network device matches the auto-grouping criteria. If the processing part determines that a newly discovered network device matches the auto-grouping criteria, the processing part automatically adds the newly discovered network device to the corresponding group item (such as group item "Replace in 2011").

Figure 17:
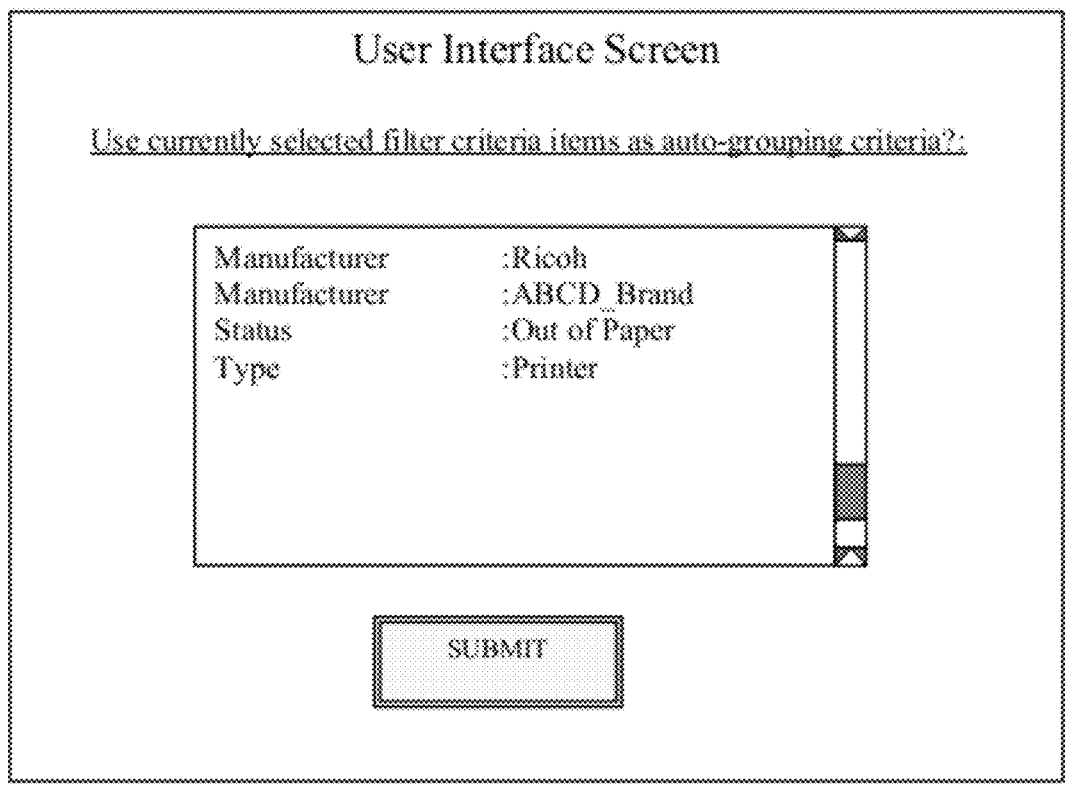
FIG. 17 illustrates an example of a user interface screen, according to another exemplary embodiment.

The user may specify the auto-grouping criteria based on, for example, currently selected filter criteria items. As a demonstrative example, if the currently selected filter items are those illustrated in FIG. 7D, and the user clicks a "Set Autogrouping Criteria" button associated with a specific group item (e.g. as illustrated in FIG. 16C), the user may be presented with the user interface screen of FIG. 17. The screen of FIG. 17 inquires whether the user would like to set the currently selected filter criteria items as the auto-grouping criteria. If the user clicks "Submit", the processing part 27c will in future determine whether any newly discovered network device matches the auto-grouping criteria. If the processing part determines that a newly discovered network device matches the auto-grouping criteria, the processing part automatically adds the newly discovered network device to the corresponding group item. The user may also select a priority setting for the auto-grouping criteria for each group within one group set, so that a newly discovered network device matching the auto-grouping criteria for more than one group in a group set is only associated with one of the group sets.

Figure 18:
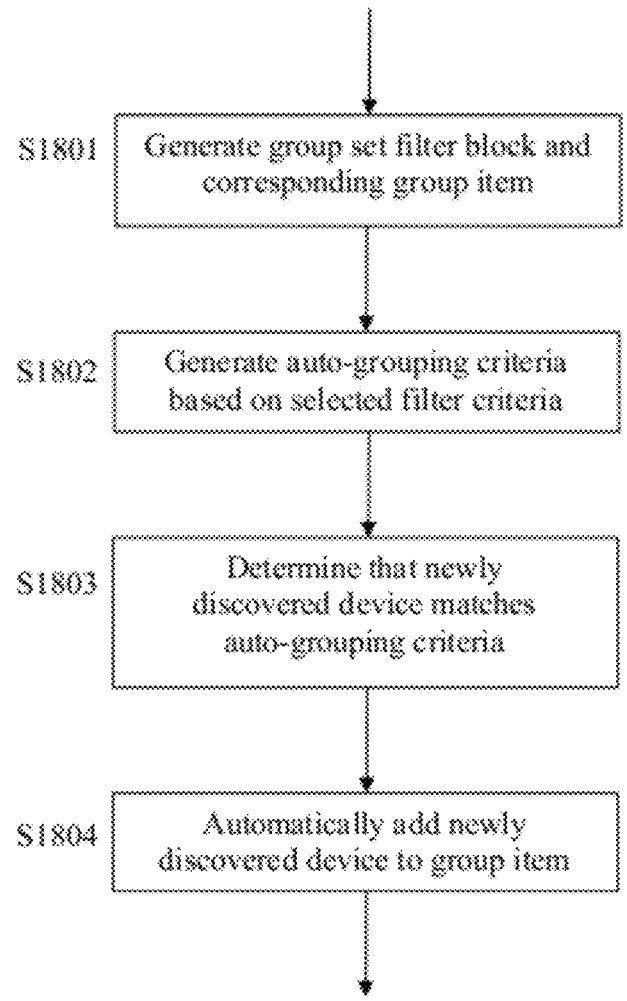
FIG. 18 shows a flowchart of a method performed by a monitoring apparatus, such as monitoring apparatus 27 illustrated in FIG. 2, according to another exemplary embodiment.

Turning now to FIG. 18, there is shown a flowchart of a method performed by a monitoring apparatus (such as apparatus 27 illustrated in FIG. 2), according to this exemplary embodiment.

In S1801, the monitoring apparatus generates a group set filter block in the filter control window, and generates a group item corresponding to the group set filter block and being associated with one or more network devices. In S1802, the monitoring apparatus generates auto-grouping criteria based on selected filter criteria items. In S1803, the monitoring apparatus determines that a newly discovered network device matches the auto-grouping criteria generated in S1802, and in S1804, the monitoring apparatus adds the newly discovered network device to the group item generated in S1801.

While the example shown in FIG. 2 includes one monitoring apparatus, it should be appreciated that such numbers of devices, terminals and apparatuses are arbitrary and are selected as an example in order to facilitate discussion, and that the subject matter of this disclosure can be implemented in a system including one or more systems, servers, apparatuses and terminals. Other devices, such as scanners, printers and multi-function devices may also be connected to a network, as is well known in the art. Further, the monitoring apparatus and network devices may be connected in a different network arrangement to that depicted in FIG. 2.

In the exemplary embodiment illustrated in FIG. 2, the monitoring apparatus is depicted as directly including or physically incorporating the device information maintaining part 27a, user interface part 27b and processing part 27c. However, one or more of the aforementioned parts of the monitoring apparatus may be located externally from the monitoring apparatus, wherein the monitoring apparatus accesses remotely the functionalities of these external parts.

For example, FIG. 19 illustrates an example of a system 1900 including monitoring apparatus 197 connected to network 1901. The monitoring apparatus 197 may be similar to monitoring apparatus 27 illustrated in FIG. 2 except that, for example, the device information maintaining part 197a of monitoring apparatus 197 is remote from the monitoring apparatus 197 and connected to a network 1906. The maintaining part 197a may obtain device information, device properties information and/or status information from one or more of the network devices 195-1 through 195-4 connected to network 1906. Further, the maintaining part 197a may communicate remotely with the processing part 197c of the monitoring apparatus 197, wherein the content of the communications may indicate the device information, device properties information and/or status of devices 195-1 through 195-4. Furthermore, the monitoring apparatus 197 may differ from the apparatus 27 of FIG. 2, in that the user interface part 197b is in fact resident locally on a client terminal 197-1 that is physically distinct from the processing part 197c of the monitoring apparatus 197. The processing part 197c causes the user interface part 197b on the client terminal 197-1 to display a filter control window and device list (including specific ones of the network devices 195-1 through 195-4 matching selected filter criteria items), in accordance with the embodiments of this disclosure.

Although the network devices 25-1 through 25-n depicted in FIG. 2 are shown as being connected to the network 21, the aspects of this disclosure may be applied to a system for monitoring a device that is not connected to a network. For example, aspects of this disclosure may be applied to a system for monitoring a device with use of radio-frequency identification (RFID) technology.

Figure 20:
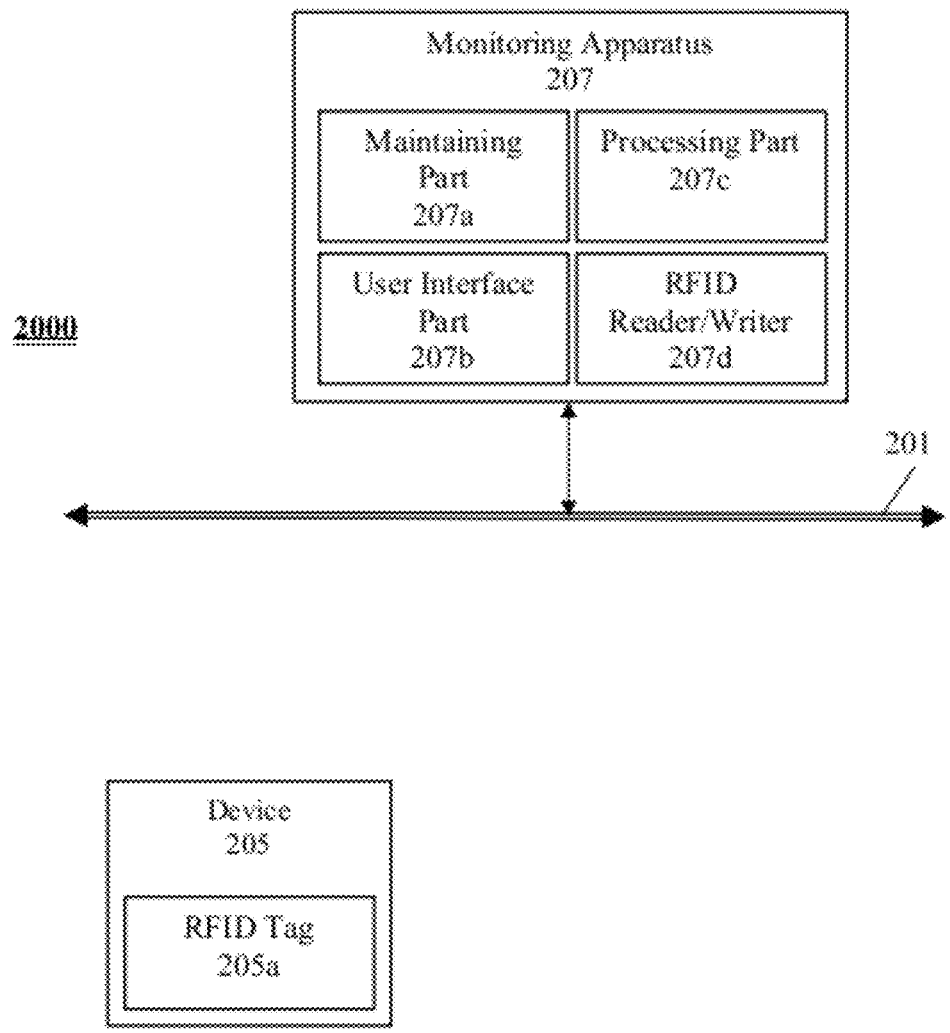
FIG. 20 shows a block diagram of a system, according to another exemplary embodiment.

FIG. 20 depicts an example of a system 2000 according to another exemplary embodiment. The system 2000 includes monitoring apparatus 207, which may be similar to the monitoring apparatus 27 depicted in FIG. 2, except that the monitoring apparatus 207 also includes an RFID Reader/Writer 207d. The system 2000 further includes a device 205 which is an IT asset that is not network-connected, (i.e. a standalone device with no network interface), such as an electronic stapler, shredder, etc. The device 205 may include an RFID tag 205a physically incorporated into the device 205, or in some way attached to the device 205. In this way, the RFID reader/writer 207c of the monitoring apparatus 207 may communicate with the RFID tag 205a of the device 205, in order to obtain device information, device properties information and/or status information from the device 205 (e.g., information indicating that the device 205 requires maintenance). The monitoring apparatus 207 may then cause a filter control window and device list to be displayed according to the exemplary embodiments of this disclosure, as described above. Aspects of RFID technology, including the ability for RFID reader/writer devices to communicate with RFID tags, are understood in the art and will not be described in detail in this disclosure.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. An apparatus for monitoring network devices, said apparatus comprising:
   a device information maintaining part that maintains, for each of the network devices, device information identifying the network device and device properties and status of the network device;
   a user interface part including a filter control window displaying a plurality of filter blocks in a specific sequence, each filter block comprising a plurality of user-selectable filter criteria items; and
   a processing part that processes the device information based on selected ones of the filter criteria items, and causes the user interface part to display a device list that includes only specific ones of the network devices matching the selected ones of the filter criteria items,
   wherein when one or more filter criteria items in a first filter block is selected, the processing part modifies all of the filter blocks appearing after the first filter block in the specific sequence to generate modified filter blocks including only filter criteria items applicable to network devices that satisfy at least one of said one or more selected filter criteria items in the first filter block, and, in said modified filter blocks appearing after the first filter block in the specific sequence, filter criteria items applicable to network devices that do not satisfy any of said one or more selected filter criteria items in the first filter block are not displayed by the user interface part, and wherein the user interface part permits user operation to remove a specified filter block amongst the plurality of filter blocks from the filter control window via a drag-and-drop operation, and the processing part, in response to the user operation to remove the specified filter block from the filter control window, causes the user interface part to (a) remove only the specified filter block from the filter control window and then (b) change the specific sequence of any remaining filter blocks in response to the removal of the specified filter block in (a), and in response to the filter criteria items of the removed filter block being effectively unselected as a result of the removed filter block being removed from the filter control window, causes the user interface part to (c) update the filter criteria items in the remaining filter blocks, including redisplaying one or more formerly-omitted filter criteria items that were omitted from the remaining filter blocks which were displayed when the specified filter block was present in the filter control window and to (d) revise the displayed device list to include only remaining network devices that match the selected filter criteria items in the remaining filter blocks displayed in the changed specific sequence.

2. The apparatus of claim 1, wherein in a case that the specified filter block is dragged out of the filter control window via a drag-and-drop operation, then the processing part unselects all of the filter control items of the specified filter block, and processes the device information based on selected filter criteria items in each of the remaining filter blocks in the filter control window, to generate the device list.

3. The apparatus of claim 1, wherein the processing part processes the device information based on the selected filter criteria items, and generates a revised device list that identifies only specific ones of the network devices matching at least one selected filter criteria item from each of the filter blocks having one or more selected filter criteria items.

4. The apparatus of claim 1, wherein for each of the filter criteria items in the first filter block, the user interface part displays a device count corresponding to a number of the network devices that match the filter criteria item, and match at least one of the selected filter criteria items from each of the filter blocks that (a) have one or more selected filter criteria items and (b) appear before the first filter block in the specific sequence.

5. The apparatus of claim 4, wherein the specific sequence is changed after the plurality of filter blocks displayed in the filter control window are rearranged via a drag-and-drop operation.

6. The apparatus of claim 4, wherein the specific sequence is changed after a new filter block is positioned inside the filter control window from a new filter block palette via a drag-and-drop operation, the changed specific sequence including the new filter block.

7. The apparatus of claim 4, wherein the content in the updated filter blocks includes updated device count information.

8. The apparatus of claim 1, wherein the processing part generates a group set filter block, and generates a group item corresponding to the group set filter block and being associated with one or more of the network devices.

9. The apparatus of claim 8, wherein
the processing part generates auto-grouping criteria based on the selected filter criteria items, and
in a case that the processing part determines that a newly discovered network device matches the auto-grouping criteria, the processing part automatically adds the newly discovered network device to the group item.

10. The apparatus of claim 1, wherein the content in the updated filter blocks includes updated status information.

11. A method for monitoring network devices, by a monitoring apparatus, said method comprising:
maintaining device information including, for each of the network devices, device properties and status of the network devices;
causing a user interface to display a filter control window including a plurality of filter blocks in a specific sequence, each filter block comprising a plurality of user-selectable filter criteria items;
processing the device information based on selected ones of the filter criteria items, and causing the user interface to display a device list including only specific ones of the network devices matching the selected ones of the filter criteria items;
determining that one or more filter criteria items in a first filter block have been selected, and modifying all of the filter blocks appearing after the first filter block in the specific sequence to generate modified filter blocks including only filter criteria items applicable to network devices that satisfy at least one of said one or more selected filter criteria items in the first filter block, and, in said modified filter blocks appearing after the first filter block in the specific sequence, filter criteria items applicable to network devices that do not satisfy any of said one or more selected filter criteria items in the first filter block are not displayed by the user interface part; and
configuring the user interface to permit user operation to remove a specified filter block amongst the plurality of filter blocks from the filter control window via a drag-and-drop operation, and in response to the user operation to remove the specified filter block,
causing the user interface to (a) remove the specified filter block from the filter control window and then (b) change the specific sequence of any remaining filter blocks in response to the removal of the specified filter block in (a), and
in response to the filter criteria items of the removed filter block being effectively unselected as a result of the removed filter block being removed from the filter control window, causing the user interface to (c) update the filter criteria items in the remaining filter blocks, including redisplaying one or more formerly-omitted filter criteria items that were omitted from the remaining filter blocks which were displayed when the specified filter block was present in the filter control window and to (d) revise the displayed device list to include only remaining network devices that match the selected filter criteria items in the remaining filter blocks displayed in the changed specific sequence.

12. The method of claim 11, further comprising:
determining that the specified filter block has been dragged out of the filter control window via a drag-and-drop operation; and
unselecting all of the filter control items of the specified filter block, and processing the device information based on selected filter criteria items in each of the remaining filter blocks in the filter control window, to generate the device list.

13. The method of claim 11, further comprising:
processing the device information based on the selected filter criteria items, and generating a revised device list that identifies only specific ones of the network devices matching at least one selected filter criteria item from each of the filter blocks having one or more selected filter criteria items.

14. The method of claim 11, further comprising: displaying, for each of the filter criteria items in the first filter block, a device count corresponding to a number of the network devices that match the filter criteria item, and match at least one of the selected filter criteria items from each of the filter blocks that (a) have one or more selected filter criteria items and (b) appear before the first filter block in the specific sequence.

15. The method of claim 11, further comprising: changing the specific sequence, in response to determining that the plurality of filter blocks displayed in the filter control window have been rearranged via a drag-and-drop operation.

16. The method of claim 11, further comprising:
changing the specific sequence, in response to determining that a new filter block has been positioned inside the filter control window from a new filter block palette via a drag-and-drop operation, the changed specific sequence including the new filter block.

17. The method of claim 11, further comprising:
generating a group set filter block in the filter control window, and
generating a group item corresponding to the group set filter block and being associated with one or more of the network devices.

18. The method of claim 17, further comprising:
generating auto-grouping criteria based on the selected filter criteria items;
determining that a newly discovered network device matches the auto-grouping criteria; and
automatically adding the newly discovered network device to the group item.

* * * * *